United States Patent
Udeshi et al.

(10) Patent No.: US 9,860,757 B2
(45) Date of Patent: Jan. 2, 2018

(54) WIRELESS ACCESS POINT INSTALLATION ANALYZER AND REPORTING

(71) Applicant: Time Warner Cable Enterprises LLC, New York, NY (US)

(72) Inventors: Dharmen K. Udeshi, Fairfax, VA (US); Ashish A. Patel, Reston, VA (US)

(73) Assignee: Time Warner Cable Enterprises LLC, St. Louis, MO (US)

( * ) Notice: Subject to any disclaimer, the term of this patent is extended or adjusted under 35 U.S.C. 154(b) by 0 days.

(21) Appl. No.: 15/005,225

(22) Filed: Jan. 25, 2016

(65) Prior Publication Data

US 2017/0215085 A1    Jul. 27, 2017

(51) Int. Cl.
*H04M 11/00* (2006.01)
*H04W 16/18* (2009.01)
*H04W 64/00* (2009.01)

(52) U.S. Cl.
CPC ......... *H04W 16/18* (2013.01); *H04W 64/003* (2013.01); *H04W 64/006* (2013.01)

(58) Field of Classification Search
CPC .. H04W 16/18; H04W 64/003; H04W 64/006
USPC ....................................................... 455/405
See application file for complete search history.

(56) References Cited

U.S. PATENT DOCUMENTS

| 8,040,864 | B2 | 10/2011 | Karaoguz et al. | |
| 9,363,747 | B2 * | 6/2016 | Geller | H04W 48/20 |
| 2015/0215791 | A1 * | 7/2015 | Geller | H04W 24/02 |
| | | | | 455/446 |

* cited by examiner

*Primary Examiner* — Amancio Gonzalez
(74) *Attorney, Agent, or Firm* — Chapin IP Law, LLC

(57) ABSTRACT

An analyzer resource receives usage information collected by an application executing in a roaming mobile device; the usage information indicates geographical regions (and potentially specific locations) in which the roaming mobile communication device wirelessly accesses a remote network (such as the Internet) using any of one or more different wireless access services. The analyzer resource is further operable to receive resource information indicating locations of physical network resources available to support installation of wireless access points in the geographical regions and the location of any existing wireless access points already installed. The analyzer resource then uses at least the application-collected usage information and the resource information to identify where to install at least one new wireless access point. Further disclosed embodiments herein include generating a respective map indicating in which of one or more respective geographical regions it is desirable to install a respective new wireless access point.

35 Claims, 20 Drawing Sheets

USAGE INFO.
120-1

| SUBSCRIBER: JAMES SMITH | | | | | |
|---|---|---|---|---|---|
| DATE AND TIME OF USE | | GEOGRAPHICAL LOCATION | DURATION OF SESSION | TYPE OF COMMN. | WIRELESS LINK QUALITY |
| 1-3-16 | 5:22 PM | 213-2 | 25 MINUTES | WIFI | VERY GOOD |
| 1-3-16 | 8:31 PM | 213-2 | 18 MINUTES | WIFI | POOR |
| 1-4-16 | 5:13 PM | 213-2 | 35 MINUTES | WIFI | GOOD |
| 1-6-16 | 5:11 PM | 213-3 | 20 MINUTES | CELL | GOOD |
| 1-8-16 | 7:11 AM | 212-4 | 6 MINUTES | CELL | VERY GOOD |
| 1-9-16 | 7:32 PM | 214-3 | 16 MINUTES | WIFI | VERY GOOD |
| 1-12-16 | 6:47 AM | 212-4 | 6 MINUTES | CELL | VERY GOOD |

USAGE INFO.
120-2

SUBSCRIBER: JOHN DOE

| DATE AND TIME OF USE | | GEOGRAPHICAL LOCATION | DURATION OF SESSION | TYPE OF COMMN. | WIRELESS LINK QUALITY |
|---|---|---|---|---|---|
| 1-3-16 | 4:15 PM | 213-3 | 4 MINUTES | CELL | POOR |
| 1-7-16 | 12:31 PM | 213-2 | 7 MINUTES | WIFI | GOOD |
| 1-9-16 | 8:13 PM | 214-3 | 22 MINUTES | WIFI | VERY GOOD |
| 1-9-16 | 5:36 PM | 212-4 | 2 MINUTES | CELL | VERY GOOD |
| 1-9-16 | 9:11 AM | 213-4 | 6 MINUTES | CELL | VERY GOOD |
| 1-9-16 | 10:32 AM | 213-4 | 65 MINUTES | WIFI | GOOD |
| 1-10-16 | 12:47 AM | 211-1 | 4 MINUTES | WIFI | VERY GOOD |

USAGE INFO.
120-3

118-3

SUBSCRIBER: DAVID JOHNSON

| DATE AND TIME OF USE | | GEOGRAPHICAL LOCATION | DURATION OF SESSION | TYPE OF COMMN. | WIRELESS LINK QUALITY |
|---|---|---|---|---|---|
| 1-2-16 | 11:54 PM | 213-6 | 25 MINUTES | WIFI | VERY GOOD |
| 1-3-16 | 10:28 AM | 213-2 | 4 MINUTES | CELL | GOOD |
| 1-5-16 | 3:54 PM | 214-4 | 16 MINUTES | WIFI | POOR |
| 1-6-16 | 2:30 PM | 215-5 | 92 MINUTES | WIFI | VERY GOOD |
| 1-6-16 | 10:05 PM | 214-3 | 25 MINUTES | WIFI | VERY GOOD |
| 1-8-16 | 9:44 PM | 212-4 | 78 MINUTES | WIFI | GOOD |

FIG. 14

WIRELESS ACCESS POINT INSTALLATION ANALYZER AND REPORTING

BACKGROUND

Conventional RF (Radio Frequency) technology has been used for many years to connect wireless devices such as phones, laptops, etc., to a landline network and/or other wireless networks. Today, RF technology supports many different types of connection services such as voice communications, high-speed data services, WiFi™ connectivity, and so on.

One type of mature RF technology is so-called cellular network technology. Conventional cellular network technology typically includes an expansive land area that has been divided into so-called cellular regions. A single cellular base station typically resides in each cell. The single cellular base station typically provides coverage over multiple square miles of land. Often, a base station in a respective cell is connected to a landline network. Via wireless phone communications between the respective cell phone and base station, the wireless subscriber operating a cell phone in the cellular region is able to communicate with or have access to the landline network.

Another type of RF technology is known as Wi-Fi™. This more recently implemented wireless technology includes large-scale installation of WiFi™ base stations. In comparison to the conventional long-range cellular network technology as previously discussed, WiFi™ technology supports short-range communications such as around 200-300 meters as opposed to 1500 or more meters provided by cellular telephone base stations. In comparison to installation of cellular telephone towers, installation of WiFi™ base stations is substantially less expensive.

The wireless coverage in a vicinity of a respective WiFi™ base station is sometimes called a WiFi™ hot spot. As mentioned, wireless coverage provided by a WiFi™ base station is typically much smaller than wireless coverage provided by a corresponding long-range base station disposed on a cellular telephone tower.

When located within a WiFi™ hotspot, a mobile device operated by a corresponding user is able to establish a wireless communication link between the mobile device and the WiFi™ base station. Via communications over the wireless communication link, the mobile device has access to hardwired networks and is able to perform operations such as retrieve data from and transmit data to other resources (such as servers) in a network environment.

Conventional installation of a wireless access point (such as one or more WiFi™ base stations) at a particular geographical region typically requires the installer to take into account a number of installation factors. For example, assuming that the installer plans to communicatively couple a newly installed wireless access point directly to a physical network cable, the installer must consider where and how the newly installed wireless access point is going to be connected to an existing physical network cable. The installer may be limited to tapping into certain locations along the existing network cable where the newly installed wireless access point can be attached.

It should be noted that wireless coverage provided by a respective wireless access point can be limited for any number of reasons. For example, a geographical region may include any number of RF-blocking obstacles such as buildings, trees, etc., that potentially block wireless signals from reaching prospective targets. Thus, when installing a respective wireless access point, in order to provide good wireless coverage to users in the geographical region, the installer may also take into account where a majority of respective users will likely operate their mobile devices within the geographical region to provide optimal wireless coverage to such users, avoiding interference by the RF-blocking obstacles to the extent possible.

BRIEF DESCRIPTION OF EMBODIMENTS

Conventional techniques of installing one or more wireless access point in each of multiple geographical regions suffer from deficiencies. For example, it may be known that a large number of mobile device users typically frequent a particular geographical region based on predicted density of users. In such an instance, as discussed above, an installer may dispatch a technician to install one or more wireless access point in such regions. However, even if it is known that wireless users are present in a geographical region, installation of new wireless access points in high traffic areas does not always ensure that a respective service provider funding the installations will financially benefit from installations. As an example, users in fast-moving automobiles may pass through a particular geographical region and connect to a respective wireless network. Such a geographical region is not necessarily a good location in which to install a respective wireless access point.

Embodiments herein deviate with respect to conventional techniques. For example, embodiments herein include novel ways of collecting wireless usage information and the using the collected wireless usage information to determine whether it is desirable to install a respective wireless access point in each of many possible geographical regions.

More specifically, in accordance with one embodiment, an analyzer resource receives feedback generated by multiple communication devices operating in a network environment. One or more different types of applications executed on the mobile communication devices can be configured to generate the feedback. In one embodiment, the feedback indicates usage of wireless network services by the multiple communication devices to access a remote network such as the Internet.

In addition to receiving the feedback of wireless usage, the analyzer resource as described herein identifies multiple candidate geographical regions such as geographical regions in which a first service provider currently does not have or has insufficient wireless access points installed. The candidate regions represent locations in which to potentially expand the first service provider's wireless network via installation of a new wireless access point to provide future network access to the multiple communication devices. As further described herein, the analyzer resource utilizes the feedback (wireless usage information) collected from applications on the mobile communication devices as a basis to select in which of the one or more multiple candidate geographical regions to install a respective new wireless access point.

In accordance with further embodiments, the analyzer resource can be configured to use a combination of the received feedback from mobile communication devices and resource availability information indicating resources available within the candidate geographical regions as a basis in which to produce a respective metric indicating a desirability of installing a respective new wireless access point in a corresponding candidate geographical region.

Embodiments herein are useful over conventional techniques because they provide unique ways of quickly assessing the value of installing a respective new wireless access point in a corresponding candidate geographical region. For example, subsequent to analyzing different candidate geographical regions and relevant input usage parameters via an analyzer resource, a corresponding generated map indicates one or more locations of a region of interest where it is makes financial sense to expand a wireless network via installation of a respective one or more new wireless access points.

These and other more specific embodiments are disclosed in more detail below.

Note that any of the resources as discussed herein can include one or more computerized devices, servers, base stations, wireless communication equipment, communication management systems, workstations, handheld or laptop computers, or the like to carry out and/or support any or all of the method operations disclosed herein. In other words, one or more computerized devices or processors can be programmed and/or configured to operate as explained herein to carry out different embodiments of the invention.

Yet other embodiments herein include software programs to perform the steps and operations summarized above and disclosed in detail below. One such embodiment comprises a computer program product including a non-transitory computer-readable storage medium (i.e., any physical computer readable hardware storage medium) on which software instructions are encoded for subsequent execution. The instructions, when executed in a computerized device (e.g., computer processing hardware) having a processor, program and/or cause the processor to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, etc., or other medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One or more embodiments herein include a computer readable storage medium and/or system having instructions stored thereon. The instructions, when executed by computer processor hardware, cause the computer processor hardware (such as in a mobile computer device) to: receive feedback generated by multiple communication devices operating in a network environment, the feedback indicating usage of existing wireless access points and corresponding wireless services by the multiple communication devices to access a remote network; identify multiple candidate geographical regions in which to expand a wireless network; and utilize the feedback as a basis to select in which of the multiple geographical regions to install a new wireless access point to provide the multiple communication devices future access to the remote network.

One or more additional embodiments herein include a computer readable storage medium and/or system having instructions stored thereon. The instructions, when executed by computer processor hardware (such as in a mobile communication device), cause the computer processor hardware to: track use of the mobile communication device accessing a remote network over a set of existing wireless access points; produce feedback indicating attributes of the mobile communication device accessing the network via the existing wireless access points; forward the feedback for distribution to an analyzer resource, the analyzer resource operable to utilize the feedback to select a particular geographical region in which to install a new wireless access point for use by the mobile communication device to access the network.

Note that the ordering of the operations above has been added for clarity sake. Further note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor, or within an operating system or a within a software application.

As discussed herein, techniques herein are well suited for identifying suitable locations in which to install one or more respective new wireless access points to expand a wireless network. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

BRIEF DESCRIPTION OF THE DRAWINGS

FIG. 12 is an example diagram illustrating wireless usage information collected by a first communication device according to embodiments herein.

FIG. 13 is an example diagram illustrating wireless usage information collected by a second communication device according to embodiments herein.

FIG. 14 is an example diagram illustrating wireless usage information collected by a third communication device according to embodiments herein.

Figure 1:
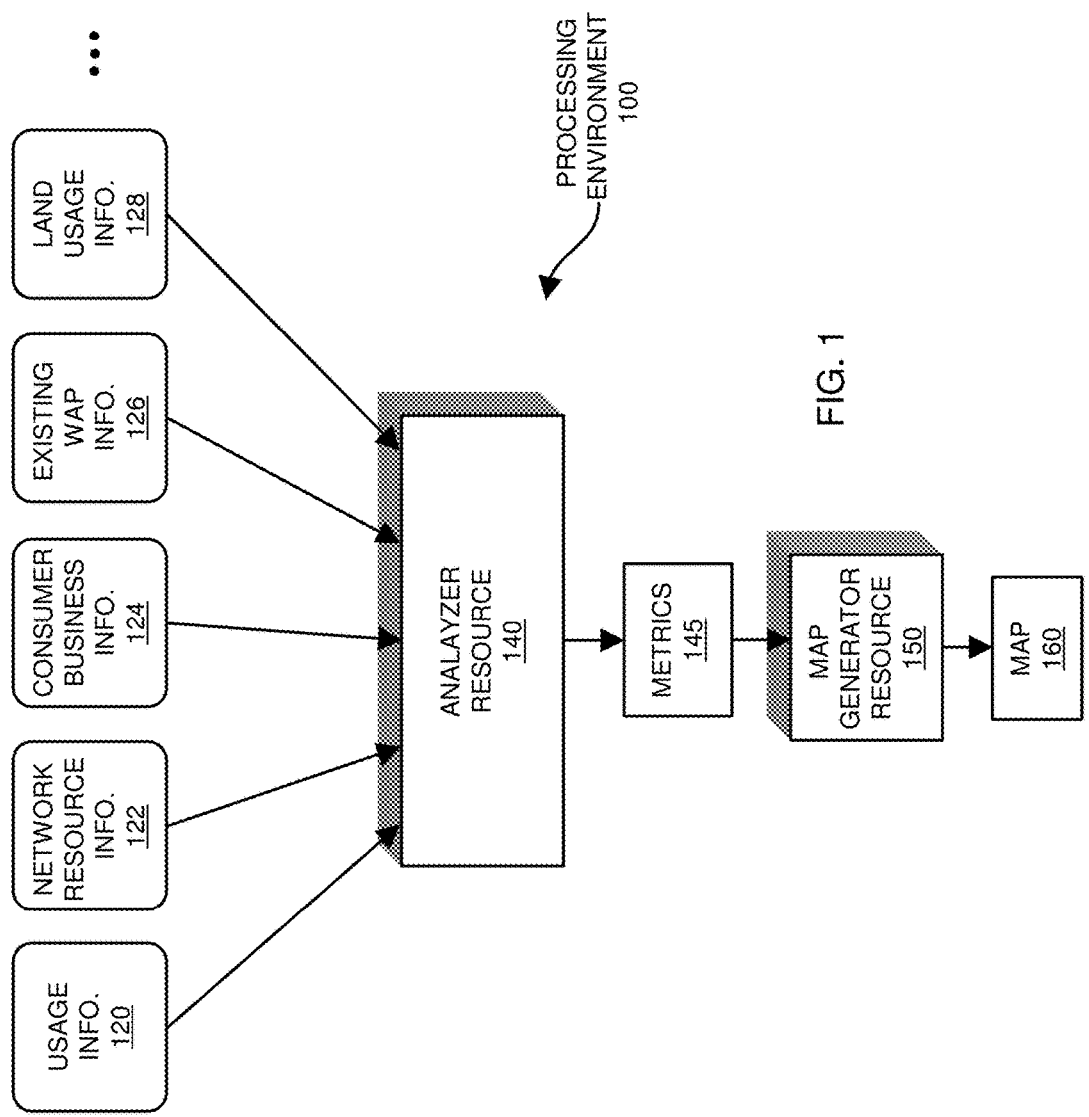
FIG. 1 is an example diagram illustrating generation of metrics and map information according to embodiments herein.

Note that the foregoing and other objects, features, and advantages of the invention(s) will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION AND FURTHER SUMMARY OF EMBODIMENTS

Now, more specifically, FIG. 1 is an example diagram illustrating processing of information to produce metrics and one or more respective maps according to embodiments herein. As further shown below, embodiments herein include novel ways of analyzing, determining, and providing notification whether it is desirable to install a respective wireless access point in each of multiple candidate geographical regions.

Processing environment 100 in FIG. 1 includes analyzer resource 140 as well as map generator resource 150. In this example embodiment, analyzer resource 140 receives information such as usage information 120, network resource information 122, consumer business information 124, existing wireless access point information 126, land usage information 128, etc.

In one embodiment, usage information 120 specifies a density of unique outdoor mobile device users that frequent a particular geographical region. In other words, the usage information indicates how many unique outdoor mobile device users are present in each of multiple different geographical regions. As described herein, geographical regions with a high density of mobile device users are typically good candidates to install a respective one or more new wireless access point if one does not already exist and other conditions are met as determined by these embodiments.

As further discussed below, note that any suitable type of resource can be configured to collect usage information 120 for use by the analyzer resource 140. For example, in one embodiment, each of multiple mobile communication devices operated by respective subscribers can be configured to execute one or more applications that keep track of usage information associated with a respective mobile communication device. The usage information 120 collected by an application associated with the mobile communication device can include attributes such as a date and time of use, geographical region in which the mobile communication device is operated while accessing a respective network such as the Internet, a duration of a respective communication session, type of wireless communications during the logged communication session, corresponding wireless link quality associated with the communication session, etc.

Further in this example embodiment, consumer business information 124 specifies locations of different businesses (such as customer-visited businesses) such as coffee shops, retail outlets, etc., that are likely to attract mobile device users. A presence of one or more businesses in a particular area may also indicate that the area is a good candidate for installation of a respective new wireless access point if one does not already exist in such a region.

As its name suggests, land usage information 128 specifies additional geographical regions or landmarks where it is likely that mobile device users will be present. For example, usage information 126 can be evaluated in locations such as parks, landmarks, rest areas, scenic views, etc., where a high number of mobile device users are likely to be present.

Any combination of the usage information 120, consumer business information 124, land usage information 128, etc., can be used to identify particular regions where it may be beneficial to install a respective new wireless access point based on a presence of high numbers of mobile device users above a threshold value.

Further in this example embodiment, note that existing wireless access point information 126 indicates the locations of currently installed outdoor wireless access points. If desired, these locations can be ignored when performing an installation analysis because one or more wireless access points already exist in such regions.

As previously mentioned, analyzer resource 140 also can be configured to receive network resource information 122. In one non-limiting example embodiment, the network resource information 122 indicates locations where existing infrastructure facilitates installation of a corresponding new wireless access point. For example, the network resource information 122 can indicate locations of resources such as so-called aerial strands between telephone poles (or telephone poles or other suitable structures) where a corresponding physical network cable is available to easily install a corresponding new wireless access point. The existing physical network cable provides connectivity to a network such as the Internet.

In addition to indicating locations of above ground resources, note that the network resource information 122 can indicate locations of additional resources such as underground network cables that are available to install wireless access points. Knowing the locations of available network resources facilitating installation of the new wireless access points is useful during analysis because certain geographical regions can be dismissed if appropriate resources are not easily available in a particular geographical region. In other words, if a corresponding geographical region is more than a few hundred feet away from a nearest physical network cable, the corresponding geographical region may be dismissed as a candidate for installing a new wireless access point because installation costs would be prohibitive.

Via processing of the different types of received information (such as usage information 120, network resource information 122, etc.), the analyzer resource 140 produces a metric for each of multiple geographical regions.

As mentioned, in one non-limiting example embodiment, a respective generated metric for a corresponding geographical region indicates whether or not it is desirable to install a respective wireless access point in the corresponding geographical region.

In accordance with further embodiments, map generator resource 150 utilizes the generated metrics 145 to produce a respective map 160. In one embodiment, as further discussed below, the map 160 can include a rendition of each of multiple geographical regions. Using the metrics 145, the map generator resource 150 initiates display of a corresponding visual indicator for each of the geographical regions. For example, the corresponding visual indicator for a respective geographical region indicates whether it is desirable or not to install a respective wireless access point in the geographical region. Thus, via review of the map on display media such as a display screen, paper, etc., a reviewer is able to quickly identify optimal locations to install new wireless access points.

Figure 2:
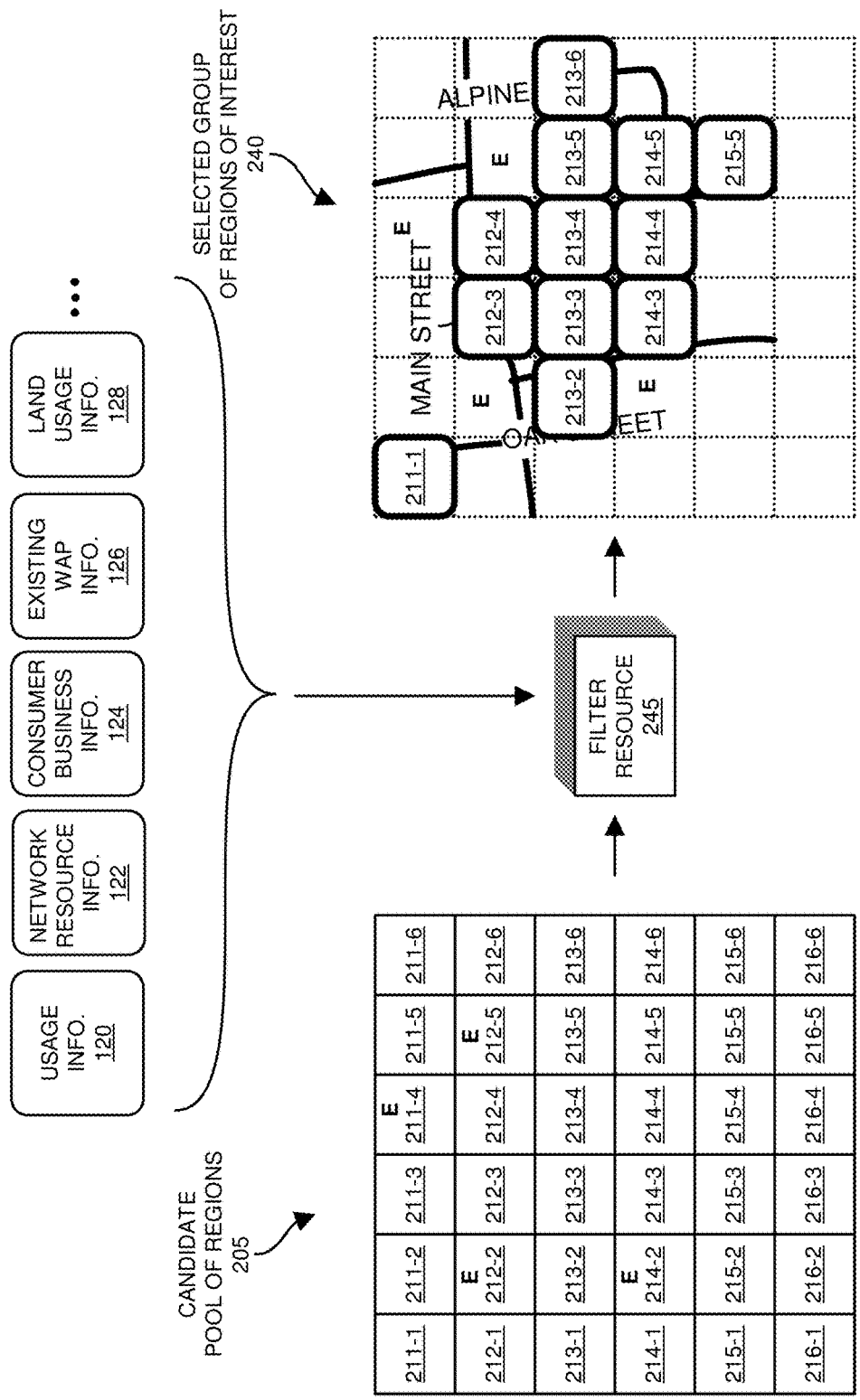
FIG. 2 is an example diagram illustrating parsing and analysis of a region of interest to identify candidate geographical regions for installation of respective one or more wireless access points according to embodiments herein.

FIG. 2 is an example diagram illustrating parsing and analysis of a region of interest to identify candidate geographical regions for installation of respective wireless access points according to embodiments herein.

Assume in this example embodiment that a user selects a particular region of interest (such as a city) to analyze whether it is desirable to install one or more corresponding new wireless access points (such as WiFi™ base stations).

In response to receiving a parameter specifying a region of interest, the analyzer resource 140, subdivides the specified region of interest into a candidate pool of regions 205 (or analytic units) including geographical region 211-1, geographical region 211-2, geographical region 211-3, geographical region 211-4, geographical region 211-5, geographical region 211-6, geographical region 212-1, geographical region 212-2, geographical region 212-3, geographical region 212-4, geographical region 212-5, geographical region 212-6, geographical region 213-1, geographical region 213-2, geographical region 213-3, geographical region 213-4, geographical region 213-5, geographical region 213-6, geographical region 214-1, geographical region 214-2, geographical region 214-3, geographical region 214-4, geographical region 214-5, geographical region 214-6, geographical region 215-1, geographical region 215-2, geographical region 215-3, geographical region 215-4, geographical region 215-5, geographical region 215-6, geographical region 216-1, geographical region 216-2, geographical region 216-3, geographical region 216-4, geographical region 216-5, and geographical region 216-6.

Note that although the region of interest is subdivided into square partitions in this non-limiting example embodiment, each of the geographical regions can be of any suitable shape such as octagon, circle, etc.

The geographical regions can be selected to be of any suitable size. For example, in one non-limiting example embodiment, each of the geographical regions is of approximately equal size such as around 328 square feet of area (100 meters×100 meters). In most cases, a single base station (wireless access point) installed in a respective geographical region supports full wireless coverage to any mobile device users that happen to be in the geographical region.

Embodiments herein include the discovery that some of the geographical regions residing in the candidate pool of regions 205 may not be good candidates to install a respective new wireless access point.

For example, usage information 120 may indicate that very few mobile device users frequent a particular geographical region. In such an instance, for any geographical regions in which the number of mobile device users is below a threshold density value, the filter resource 245 (associated with analyzer resource 140) eliminates such corresponding geographical regions from consideration.

Assume in this example embodiment that a combination of the usage information 120, consumer business information 124, and/or land usage information 126 indicates that the following geographical regions have a sufficiently low number of mobile device users present in a respective region such that the geographical regions do not warrant installation of a new wireless access point: geographical region 211-2, geographical region 211-3, geographical region 211-5, geographical region 211-6, geographical region 212-1, geographical region 212-6, geographical region 213-1, geographical region 214-1, geographical region 214-6, geographical region 215-1, geographical region 215-2, geographical region 215-3, geographical region 215-4, geographical region 215-6, geographical region 216-1, geographical region 216-2, geographical region 216-3, geographical region 216-4, geographical region 216-5, and geographical region 216-6. In such an instance, the filter resource 245 removes these geographical regions from a candidate list. Thus, selection of the multiple geographical regions from the candidate pool of regions 205 can include utilizing the mobile device user density information as specified by the usage information 120 as well as other information such as consumer business information 124, land usage information 128, etc., to identify which of the regions in the candidate pool are of interest because they are frequented (or most likely frequented) by more than a threshold number of mobile device users Assume further in this example embodiment that existing wireless access point information 128 indicates that geographical region 211-4, geographical region 212-2, geographical region 212-5, and geographical region 214-2 all have a currently installed one or more wireless access point to serve a respective geographical region. As shown in this example, each of the regions in which a wireless access point already exists includes a marking with a letter E (Existing). In such an instance, the filter resource 245 removes these geographical regions marked with the letter E from the candidate list. More specifically, in one non-limiting example embodiment, because it is known that a wireless access point exists in each of the geographical regions 211-4, 212-2, 212-5, and 214-2, there is no need to perform a return-on-investment analysis whether to install a new wireless access point in such regions. Thus, selection of multiple regions from the candidate pool of regions 205 (to produce selected group 240) can include filtering out geographical regions of the candidate pool 205 in which an access point resource is already installed. In accordance with further embodiments, via existing wireless access point information 126, the analyzer resource 140 as described herein keeps track of the regions where wireless access points already exist. As further discussed later in this specification such as in FIG. 7, the map manager 150 can be configured to provide a visual indication on a respective generated map 160 to utilize existing wireless access point information 126 (indicating locations of existing wireless access points and corresponding regions) to indicate geographical regions in which a respective wireless access point is already installed.

Referring again to FIG. 2, note that further embodiments herein can include utilizing the network resource information 120 to identify which of the regions in the candidate pool resides within a threshold distance of a corresponding physical network resource available to support installation of a respective wireless access point. As specified by the network resource information 122, if no network infrastructure is available (within a threshold distance such as 500 feet) in a corresponding geographical region to install a new wireless access point, the filter resource 245 can be configured to exclude the candidate geographical region from inclusion in the group of selected geographical regions of interest 240.

Accordingly, via application of the different types of information including usage information 120, consumer business information 124, and usage information 126, and existing wireless access point information 128, etc., the filter resource 245 selects a group of geographical regions of interest 240.

As shown in this example, the group of geographical regions of interest 240 includes geographical region 211-1, geographical region 212-3, geographical region 212-4, geographical region 213-2, geographical region 213-3, geographical region 213-4, geographical region 213-5, geographical region 213-6, geographical region 214-3, geographical region 214-4, geographical region 214-5, and geographical region 215-5.

Figure 3:
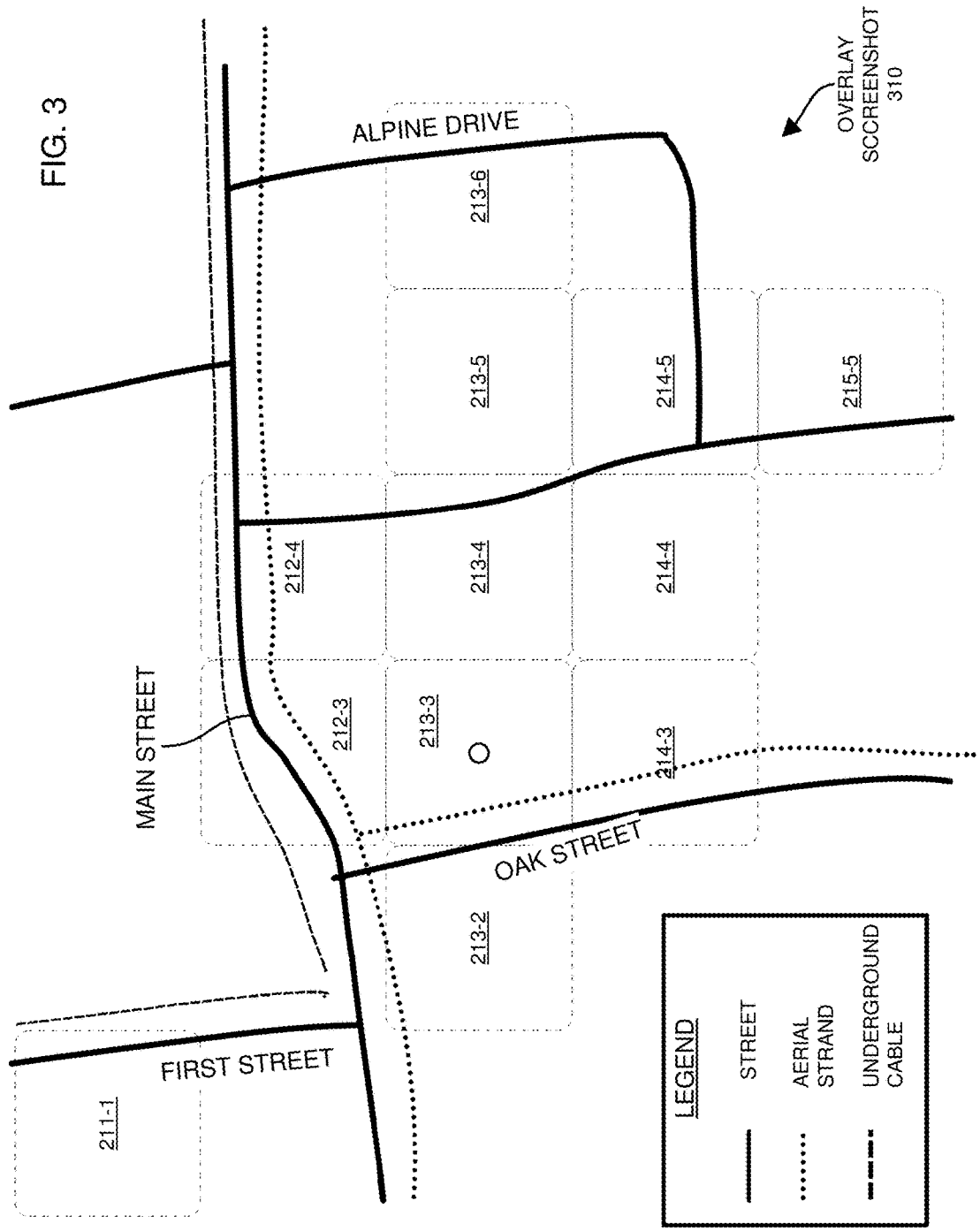
FIG. 3 is an example diagram illustrating an overlay specifying available network resources with respect to candidate geographical regions according to embodiments herein

FIG. 3 is an example diagram illustrating an overlay of available network resources with respect to candidate geographical regions according to embodiments herein.

In one embodiment, the network resource information 122 includes a map of network resources (e.g., aerial strands, underground cables, telephone poles, etc.) that are available to facilitate installation of a respective new wireless access point. As its name suggests, overlay screenshot 310 includes the group of geographical regions of interest 240 overlaid onto a map of the available network resources.

Via overlay screenshot 310, the analyzer resource 140 is able to identify a nearness of centroids (or other proposed installation location) of the geographical regions of interest to corresponding network infrastructure facilitating installation of a corresponding new wireless access point.

Figure 4:
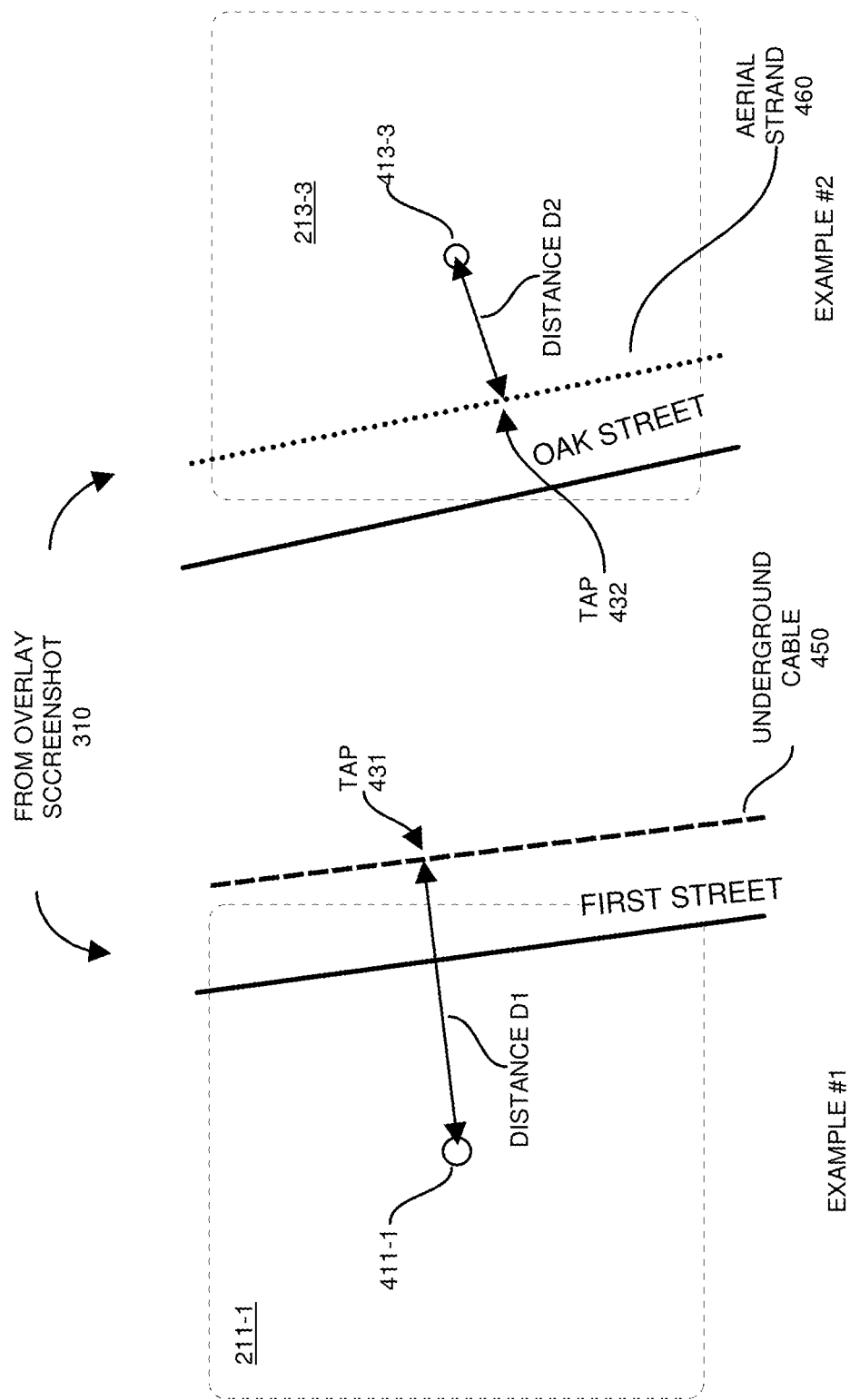
FIG. 4 is an example diagram illustrating analysis of existing network infrastructure in a corresponding geographical region to estimate a cost of installing a respective wireless access point in the corresponding geographical region according to embodiments herein.

FIG. 4 is an example diagram illustrating analysis of existing network infrastructure in a corresponding geographical region to estimate a cost of installing a respective wireless access point in the corresponding geographical region according to embodiments herein.

As mentioned, one factor to consider whether it is worthwhile to install a corresponding new wireless access point in a geographical region is the cost of installing the wireless access point in the geographical region. As further shown in FIG. 4 (zoom in of FIG. 3), embodiments herein can include analyzing a distance between a corresponding centroid (or other location) of the geographical region and available network resources in order to estimate a cost of installing a corresponding wireless access point in the geographical region.

In general, the longer the distance between a centroid of a respective geographical region and available network tap, the higher the costs of installation. Conversely, the shorter the distance between a centroid of a respective geographical region and available network tap, the lower the costs of installation.

In the example #1 in FIG. 4, the analyzer resource 140 determines that centroid 411-1 (such as a proposed location of a first wireless access point) associated with geographical region 211-1 is a distance, D1, from nearest available network access tap 431 along underground cable 450. In one embodiment, in addition to specifying the presence of the underground cable 450, note that the network resource information 122 can specify which locations along the respective continuum are available to tap into a respective underground cable 450. Thus, the tap 431 may be one point amongst multiple points on a service provider's underground cable 450 to facilitate installation of a new wireless access point.

In this example embodiment, the analyzer resource 140 utilizes the calculated distance, D1 (from centroid 411-1 to tap 431), to estimate how much it will cost to install a new wireless access point at or near centroid 411-1 in geographical region 211-1. Thus, the analyzer resource's estimated cost of installing a new wireless access point in the candidate geographical region 211-1 can take into account a distance between: i) a location of a resource (such as tap 431) providing network access, and ii) a location (such as centroid 411-1) of the wireless access point to be installed in the geographical region 211-1. Based at least in part on the distance information (D1) and possibly other installation factors such as unique characteristics of the location of the geographical region in the country, the analyzer resource 140 generates a numerical value that will be used later to generate an installation metric for geographical region 211-1.

In the example #2 in FIG. 4, the analyzer resource 140 determines that a proposed location of a second wireless access point such as centroid 413-3 associated with geographical region 213-3 is a distance, D2, from available network access tap 432 disposed on aerial strand 460 (e.g., a strand including a network cable between two telephone poles). In one embodiment, in addition to specifying the presence of the aerial strand 460, the network resource information 122 can specify which locations along the respective continuum of aerial strand 460 are available to tap a respective service provider's network. The analyzer resource 140 utilizes the calculated distance, D2 (such as shortest distance), to estimate how much it will cost to install a new wireless access point at or near centroid 413-3 in geographical region 213-3.

Thus, the analyzer resource's estimated cost of installing a new wireless access point in the candidate geographical region 213-3 can take into account a distance between: i) a location of a resource (such as tap 432) providing network access, and ii) a location (such as centroid 413-3) of the wireless access point to be installed in the geographical region 213-3.

In a similar manner, the analyzer resource 140 can be configured to use overlay screenshot 310 to estimate a respective cost of installing a new wireless access point in each of the geographical regions. In candidate geographical regions where multiple different types of resources such as both aerial strand and underground network resources exist, the analyzer resource 140 evaluates the distance to the different types of available network resources and estimates the least cost of installing a new wireless access point. Thus, in one embodiment, for each candidate geographical region, the analyzer resource 140 identifies the network resource type (such as an aerial strand, underground cable, etc.) that supports the least cost of installing a new wireless access point in that geographical region.

Figure 5:
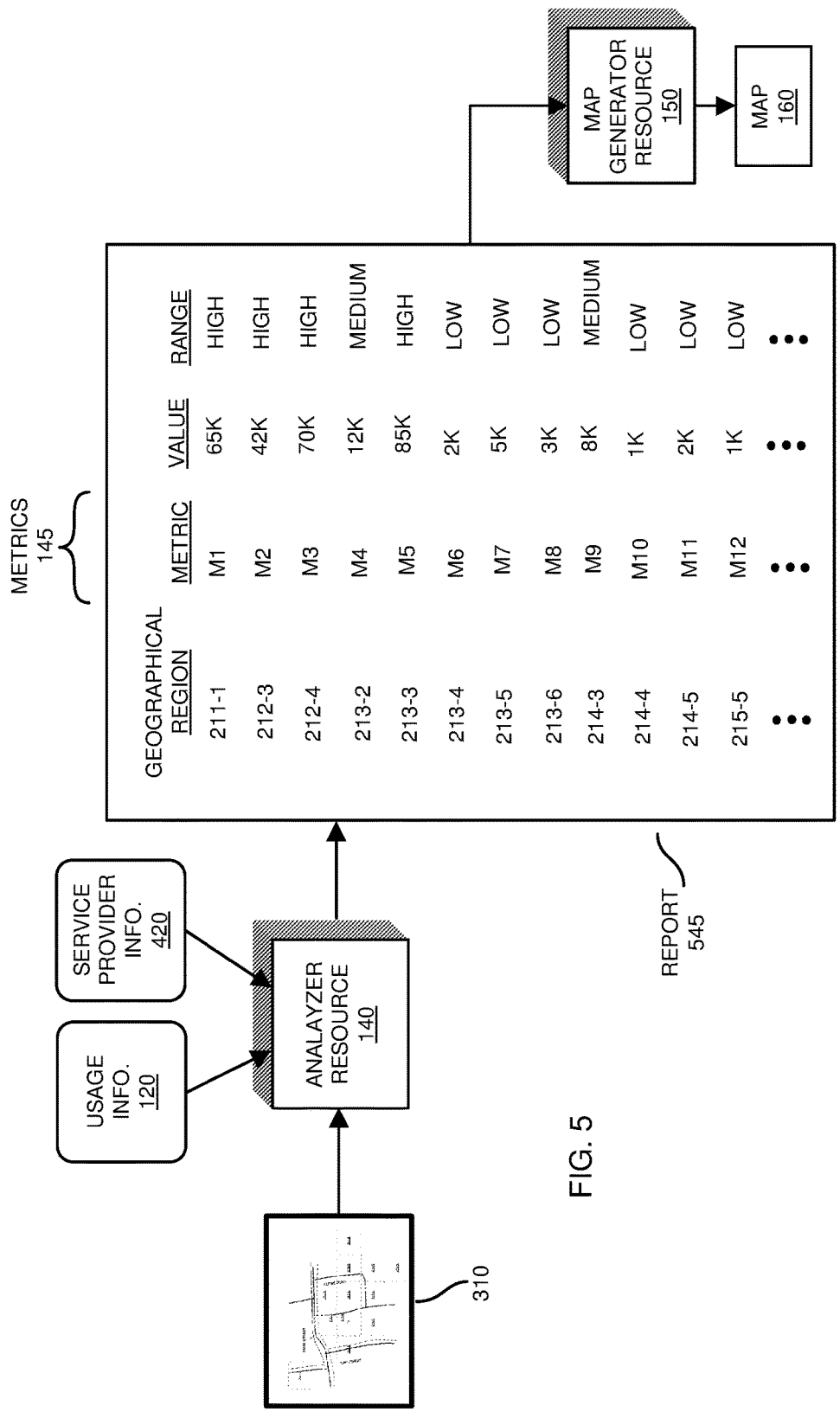
FIG. 5 is an example diagram illustrating generation of a respective installation metric for each of multiple geographical regions according to embodiments herein.

FIG. 5 is an example diagram illustrating generation of a respective installation metric for each of multiple geographical regions according to embodiments herein.

As previously discussed, the analyzer resource 140 generates a respective metric for each of the geographical regions of interest as shown in report 545. In this example embodiment, the analyzer resource 140 generates metric M1 for geographical region 211-1; the analyzer resource 140 generates metric M2 for geographical region 212-3; the analyzer resource 140 generates metric M3 for geographical region 212-4; the analyzer resource 140 generates metric M4 for geographical region 213-2; the analyzer resource 140 generates metric M5 for geographical region 213-3; the analyzer resource 140 generates metric M6 for geographical region 213-4; the analyzer resource 140 generates metric M7 for geographical region 213-5; the analyzer resource 140 generates metric M8 for geographical region 213-6; the analyzer resource 140 generates metric M9 for geographical region 214-3; the analyzer resource 140 generates metric M10 for geographical region 214-4; the analyzer resource 140 generates metric M11 for geographical region 214-5; the analyzer resource 140 generates metric M12 for geographical region 215-5; and so on.

In one embodiment, when generating a respective metric for a corresponding geographical region, the analyzer resource 140 takes into account a number of parameters such as i) an anticipated costs of installing a respective wireless access point in the corresponding geographical region (which may be based on distance as discussed above) and ii) estimated revenues that are anticipated to be generated by installation of the respective wireless access point in the corresponding geographical region. In such an instance, each of the metrics represents a balance between costs of installing and/or maintaining a respective wireless access point in a geographical region and expected returned revenues for the wireless access point.

In one non-limiting example embodiment, each of the generated metrics 145 represent an estimated value (such as a financial value) associated with installing a wireless access point in a geographical region. More specifically, metric M1 indicates a respective value associated with installing a wireless access point in geographical region 211-1; metric M2 indicates a respective value associated with installation of a respective wireless access point in geographical region 212-3; metric M3 indicates a respective value associated with installation of a respective wireless access point in geographical region 212-4; and so on.

In further example embodiments, each of the generated metrics represents an expected return-on-investment for installing a wireless access point in a given geographical region. A respective magnitude of the metrics 145 indicates geographical regions in which it is most beneficial to install a respective new wireless access point.

Subsequent to generating report 545, the map generator resource 150 is able to generate a respective map 160 including each of the geographical regions. In one embodiment, when generating a respective map 160, the map generator resource 150 provides a visual indication on map 160 that the first geographical region 211-1 has been assigned the first metric M1; the map generator resource 150 provides a visual indication on map 160 that the second geographical region 212-3 has been assigned the second metric M2; the map generator resource 150 provides a visual indication on map 160 that the third geographical region 212-4 has been assigned the third metric M3; and so on.

As further shown, an installation metric for a respective geographical region can be a numerical value. In one embodiment, a magnitude of the numerical value indicates a degree to which it is desirable or not to install the corresponding geographical region to which the numerical value pertains. For example, a respective installation metric, M, can be configured to take into account: i) anticipated subscription revenue to be received from or associated with subscribers operating mobile devices in the corresponding geographical region, and ii) estimated costs of installing a respective wireless access point in the corresponding geographical region. Each generated installation metric can represent an overall value taking into account costs of installation (outflow of capital) as well as revenues (inflow of capital) expected to be received from subscribers that operate respective mobile devices in a geographical region.

As a more specific non-limiting example, the analyzer resource 140 can be configured to generate a respective metric for each geographical region based on the following equation:

$$\text{metric } Mx(\text{Net Value}) = (ARPU*LIFE*MUC*TPEN*TAKE) - COST;$$

where:
ARPU=monthly subscriber revenue per user (varies depending on market),
LIFE=average number of months that a subscriber subscribes to a respective service provider's data delivery services,
MUC=estimated average quantity of outdoor mobile device users per month in a corresponding geographical region, (based on: usage information 120 indicating a density of mobile device users in a respective geographical region),
TPEN=percentage of mobile device users in the corresponding geographical region that subscribe to service provider's data delivery services (such as high speed data service over a physical cable network environment), the service provider may offer the use of service in regions outside of one's subscriber domain
TAKE=percentage of service provider's subscribers that would use services provided by wireless access points in the corresponding geographical region,
COST=outflow of expenses to cover cost of installation of new wireless access point, this can include expenses such as equipment cost, utility pole rental fees, cost to install the wireless access point by a technician, maintenance fees associated with wireless access point over time, etc.

In one embodiment, the first portion (such as ARPU*LIFE*MUC*TPEN*TAKE) of the above equation represents or includes an estimated subscription revenue from (or value associated with) a set of subscribers anticipated to use a new wireless access point installed in a respective candidate geographical region. As mentioned, the second portion (COST) represents a cost of installing and/or maintaining the wireless access point in the respective candidate geographical region.

Generation of Metric M1

In one embodiment, to generate the metric M1, assume that the analyzer resource 140 derives and/or receives the following information for geographical region 211-1:
- ARPU=$40 per month,
- LIFE=20 months,
- MUC=1171 mobile device users,
- TPEN=40%,
- TAKE=20%,
- COST (based on D1=5 meters), estimated cost of installation of new wireless access point=10K.

Based on the above equation, the analyzer resource 140 produces a net asset value of 65K (such as $65,000) for metric M1.

Generation of Metric M2

Assume that the analyzer resource 140 derives and/or receives the following information for geographical region 212-3:
- ARPU=$30 per month,
- LIFE=10 months,
- MUC=7444 mobile device users,
- TPEN=30%,
- TAKE=10%,
- COST=estimated cost of installation of new wireless access point=25K.

Based on the above equation, the analyzer resource 140 produces a net asset value of 42K (such as $42,000) for metric M2.

Generation of Metric M3

Assume that the analyzer resource 140 derives and/or receives the following information for geographical region 212-4:
- ARPU=$30 per month,
- LIFE=20 months,
- MUC=4722 mobile device users,
- TPEN=30%,
- TAKE=10%,
- COST=estimated cost of installation of new wireless access point=15K.

Based on the above equation, the analyzer resource 140 produces a net asset value of 70K (such as $70,000) for metric M3.

Generation of Metric M4

Assume that the analyzer resource 140 derives and/or receives the following information for geographical region 213-2:
- ARPU=$30 per month,
- LIFE=20 months,
- MUC=944 mobile device users,
- TPEN=30%,
- TAKE=10%,
- COST=estimated cost of installation of new wireless access point=5K.

Based on the above equation, the analyzer resource 140 produces a net asset value of 12K (such as $12,000) for metric M2.

Generation of Metric M5 Assume that the analyzer resource 140 derives and/or receives the following information for geographical region 213-3:
- ARPU=$40 per month,
- LIFE=20 months,
- MUC=1171 mobile device users,
- TPEN=40%,
- TAKE=20%,
- COST (based on D1=5 meters), estimated cost of installation of new wireless access point=10K.

Based on the above equation, the analyzer resource 140 produces a net asset value of 85K (such as $85,000) for metric M5.

In a similar manner, the analyzer resource 140 generates a respective metric for each geographical region.

Figure 6:
FIG. 6 is an example map diagram illustrating return-on-investment values associated with installation of new wireless access points in different geographical regions according to embodiments herein.

In accordance with further embodiments, each of the geographical regions can be tagged as being a candidate for installation of an aerial wireless access point (in which the proposed wireless access point would be installed on an aerial resource) or an attached wireless access point (in which the proposed wireless access point would be installed to an underground cable). In such an instance, the analyzer resource 140 can be configured to generate so-called total wireless access point build information (such as output data in addition to the metrics 145) to include:
- Quantity of aerial-type WAPs (Wireless Access Points to aerial locations such as on wires/cables between telephone poles) and total net value of all aerial-type WAPs
- Quantity of attached WAPs and total value of attached WAPs (access points connected to underground cables)
- Total quantity of all WAPs and corresponding total net value FIG. 6 is an example map diagram illustrating a map that displays return-on-investment values associated with installation of new wireless access points in different geographical regions according to embodiments herein.

In this non-limiting example embodiment, the map generator resource 150 utilizes magnitudes of the generated metrics to produce a respective map 160. Attributes of the visual indication associated with the different geographical regions of the map 160 vary depending on a numerical range in which they reside. For example, in one embodiment, geographical regions assigned a net value greater than 40K (i.e., 40,000) are shaded with a darkest shading (see legend in FIG. 6); geographical regions assigned a net value between 5K (i.e., 5,000) and 40K (i.e., 40,000) are shaded with a medium degree of shading; and geographical regions assigned a net value between 0 and 5K (i.e., 5000) are shaded with a lightest degree of shading.

As previously discussed, the analyzer resource 140 generated a value of 65,000 for metric M1 associated with geographical region 211-1. Because the magnitude of the value assigned to metric M1 is greater than 40K, the map generator resource 150 shades the geographical region 211-1 on map 160 with a dark shading (or color red).

The analyzer resource 140 generates a value of 42,000 for metric M2 associated with geographical region 212-3. Because the magnitude of the value assigned to metric M2 is greater than 40K, the map generator resource 150 shades the geographical region 212-3 on map 160 with a dark shading (or color red).

The analyzer resource 140 generates a value of 70K for metric M3 associated with geographical region 212-4. Because the magnitude of the value assigned to metric M3 is greater than 40K, the map generator resource 150 shades the geographical region 212-4 on map 160 with a dark shading.

The analyzer resource 140 generates a value of 12K for metric M4 associated with geographical region 213-2. Because the magnitude of the value assigned to metric M4 is between 5K and 20K, the map generator resource 150 shades the geographical region 213-2 on map 160 with medium shading (or orange or yellow).

The analyzer resource 140 generates a value of 85K for metric M5 associated with geographical region 213-3. Because the magnitude of the value assigned to metric M5 is greater than 40K, the map generator resource 150 shades the geographical region 212-3 on map 160 with a dark shading.

The analyzer resource 140 generates a value of 2K for metric M6 associated with geographical region 213-4. Because the magnitude of the value assigned to metric M6 is between zero and 5K, the map generator resource 150 shades the geographical region 213-4 on map 160 with light shading (such as yellow or green).

In this manner, the map generator resource 150 generates different shading depending on a magnitude of value for each metric. The map generator resource 150 displays the geographical regions with different identified shading as shown in map 160 of FIG. 6.

Thus, via shading the geographical region 211-1 in map 160 with a darkest shade, the map generator resource 150 provides a visual indication to a reviewer that installation of a new wireless access point in the geographical region 211-1 has a high return-on-investment value; via shading the geographical region 212-3 in map 160 with a darkest shade, the map generator resource 150 provides a visual indication to a reviewer that installation of a new wireless access point in the geographical region 212-3 has a high return-on-investment value; via shading the geographical region 212-4 in map 160 with a darkest shade, the map generator resource 150 provides a visual indication to a reviewer that installation of a new wireless access point in the geographical region 212-4 has a high return-on-investment value; via shading the geographical region 213-2 in map 160 with a medium shade, the map generator resource 150 provides a visual indication to a reviewer that installation of a new wireless access point in the geographical region 213-2 has a medium return-on-investment value; via shading the geographical region 213-3 in map 160 with a darkest shade, the map generator resource 150 provides a visual indication to a reviewer that installation of a new wireless access point in the geographical region 213-3 has a high return-on-investment value; via shading the geographical region 213-4 in map 160 with a lesser degree of shading (light shading), the map generator resource 150 provides a visual indication to a reviewer that installation of a new wireless access point in the geographical region 213-4 has a low (but positive) return-on-investment value; via shading the geographical region 213-5 in map 160 with a lesser degree of shading, the map generator resource 150 provides a visual indication to a reviewer that installation of a new wireless access point in the geographical region 213-5 has a low (positive) return-on-investment value; and so on.

Note that map generator resource 150 can be configured to display any suitable type of visual indication. For example, if desired, the map generator resource 150 can be configured to display the metric in each corresponding geographical region to indicate a net asset value associated with installation of a new wireless access point. As a more specific example, the map generator resource 150 can be configured to display the value 65K in geographical region 211-1; the map generator resource 150 can be configured to display the value 42K in geographical region 212-3; the map generator resource 150 can be configured to display the value 70K in geographical region 212-4; and so on.

Figure 7:
FIG. 7 is a more detailed example map diagram illustrating an installation heat map according to embodiments herein.

FIG. 7 is a more detailed example map diagram illustrating an installation heat map according to embodiments herein.

In one example embodiment, the map generated by map generator resource 150 is a heat map. In such an instance, the visual indications of the geographical regions are assigned a different color value depending on a magnitude of a respective installation metric generated for the geographical region. For example, a color spectrum can include the colors red, orange, yellow, green, blue, indigo, and violet. As mentioned, the values of the respective generated installation metrics (such as metrics M1, M2, M3, M4, . . . ) can be either positive or negative numbers depending upon whether installation of a respective wireless access point would result in a positive return-on-investment or a negative return-on-investment.

In one non-limiting example embodiment, geographical regions assigned near zero return-on-investment values are assigned a color of green (e.g., a middle of the color spectrum). Regions assigned highest positive return-on-investment values are assigned a color of red. Regions assigned a positive return-on-investment value between near zero and the highest positive return-on-investment values are assigned a color between red and green (such as orange or yellow) depending on a magnitude of a value generated for the installation metric. Regions colored red on the map are typically high traffic mobile device locations (resulting in generation of higher revenues) and where network resources are available nearby to install a respective wireless access point.

In certain instances, a respective value generated for an installation metric may be less than zero (e.g., negative). If further desired, in a similar manner, the negative values can be assigned a value between green and violet depending on their magnitude. For example, geographical regions assigned highest negative return-on-investment values can be assigned the color purple. Display settings can be chosen such that a respective heat map generated by map generator resource 150 displays only certain color or shaded regions. For example, a user may provide input to the map generator resource 150 to display visual indications for geographical regions where a magnitude of respective return-on-investment metrics are greater than zero.

In this example embodiment, the map 160 in FIG. 7 indicates locations of existing wireless access points (as specified by existing wireless access point information 126 as previously discussed) as well as a color coded square indicating a magnitude of a metric generated for the corresponding geographical region. As mentioned, in one embodiment, the map generator resource 150 provides a visual indication of value by applying a first color (such as RED) to a first portion of the map 700 representing a first geographical region, the first color indicates that a magnitude of a respective metric generated for the first geographical region has been assigned a first value; the map generator resource 150 applies a second color (such as ORANGE) to a second portion of the map 700 representing a second geographical region, the second color indicates that a magnitude of a respective metric generated for the second geographical region has been assigned a second value; the map generator resource 150 applies a third color (such as YELLOW) to a third portion of the map 700 representing a third geographical region, the third color indicates that a magnitude of a respective metric generated for the third geographical region has been assigned a third value; and so on.

As previously discussed, embodiments herein are useful over conventional techniques because they provide unique ways of quickly assessing the financial value of installing a respective new wireless access point in a geographical region. For example, subsequent to analyzing the different geographical regions and relevant parameters (such as usage information 120, network resource information 122, consumer business information 124, existing wireless access point information 128, land usage information 126, etc., to generate metrics (M1, M2, M3, M4, M5, . . . ), a corresponding map indicates one or more locations of a region of interest (such as within city) where it is makes most financial sense to install a respective one or more new wireless access points and the least cost method of installation (e.g., on an aerial cable, or attached to a structure using underground cable, etc.)

In addition to the above reasons, embodiments herein are further useful over conventional techniques because an operator is able to filter out regions that are not of particular interest. For example, a service provider may be interested in viewing locations of geographical regions where installation of a respective new wireless access point in a geographical region would result in a high return on investment above a threshold value. In such an instance, service provider can input a threshold value to the map generator resource 150. Map generator resource 150 then generates corresponding map 160 (or map 700) to indicate only regions in which the analyzer resource 140 generates a value for metric above the return-on-investment threshold value.

Figure 8:
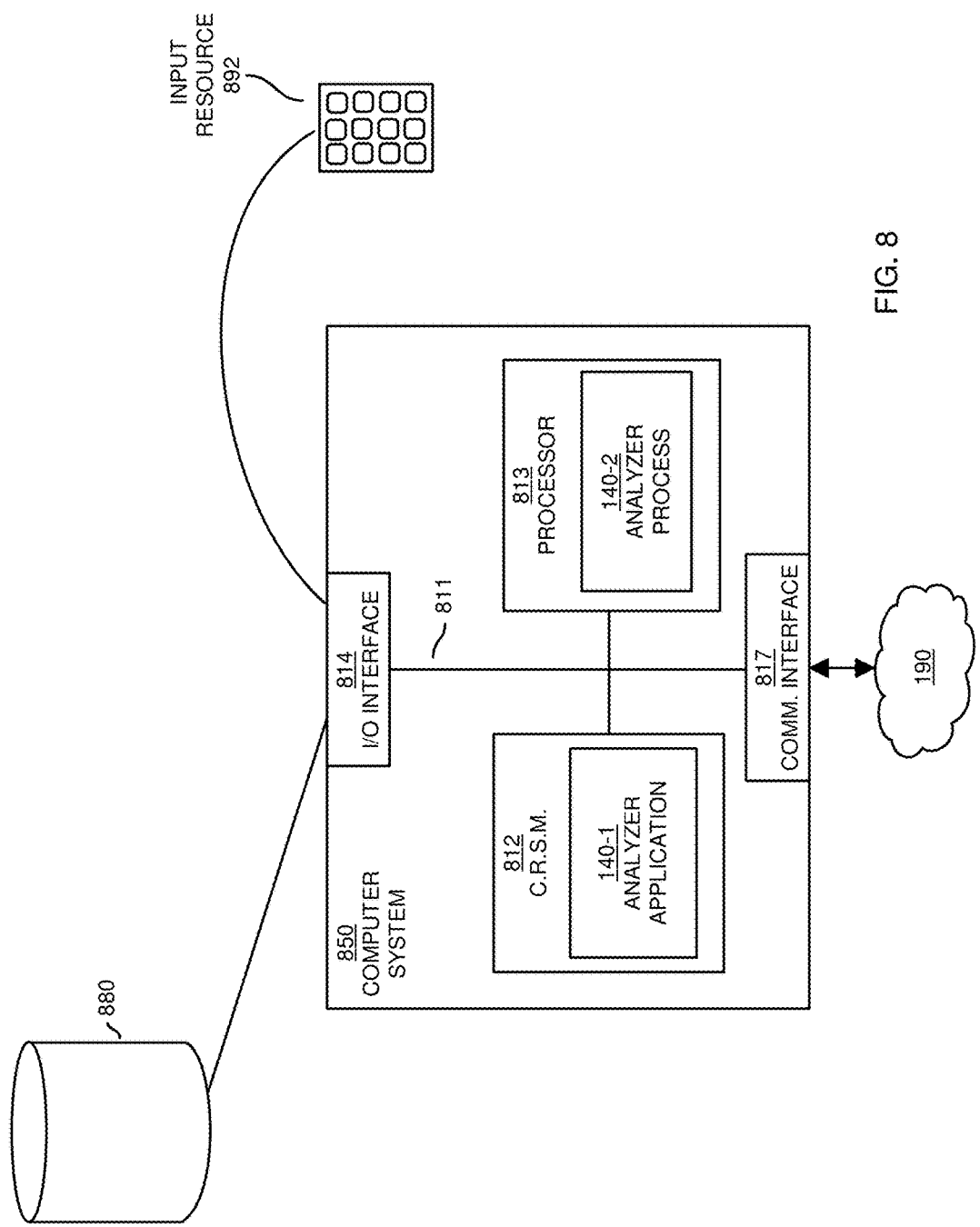
FIG. 8 is a diagram illustrating an example computer architecture in which to execute any functionality according to embodiments herein.

FIG. 8 is an example block diagram of a computer device for implementing any of the operations as discussed herein according to embodiments herein.

As shown, computer system 850 of the present example includes an interconnect 811, a processor 813 (such as one or more processor devices, computer processor hardware, etc.), computer readable storage medium 812 (such as hardware storage to store data), I/O interface 814, and communications interface 817.

Interconnect 811 provides connectivity amongst processor 813, computer readable storage media 812, I/O interface 814, and communication interface 817.

I/O interface 814 provides connectivity to a repository 880 and, if present, other devices such as a playback device, display screen, input resource 892, a computer mouse, etc.

Computer readable storage medium 812 (such as a non-transitory hardware medium) can be any hardware storage resource or device such as memory, optical storage, hard drive, rotating disk, etc. In one embodiment, the computer readable storage medium 812 stores instructions executed by processor 813 (i.e., computer processor hardware).

Communications interface 817 enables the computer system 850 and processor 813 to communicate over a resource such as network 190 to retrieve information from remote sources and communicate with other computers.

As shown, computer readable storage media 812 is encoded with analyzer application 140-1 (e.g., software, firmware, etc.) executed by processor 813. Analyzer application 140-1 can be configured to include instructions to implement any of the operations as discussed herein.

During operation of one embodiment, processor 813 (e.g., computer processor hardware) accesses computer readable storage media 812 via the use of interconnect 811 in order to launch, run, execute, interpret or otherwise perform the instructions in analyzer application 140-1 stored on computer readable storage medium 812.

Execution of the analyzer application 240-1 produces processing functionality such as analyzer process 140-2 in processor 813. In other words, the analyzer process 140-2 associated with processor 813 represents one or more aspects of executing analyzer application 140-1 within or upon the processor 813 in the computer system 850.

Those skilled in the art will understand that the computer system 850 can include other processes and/or software and hardware components, such as an operating system that controls allocation and use of hardware resources to execute analyzer application 140-1.

In accordance with different embodiments, note that computer system may be any of various types of devices, including, but not limited to, a wireless access point, a mobile computer, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or in general any type of computing or electronic device. The computer system 850 may reside at any location or can be included in any suitable resource in network environment 100 to implement functionality as discussed herein.

Functionality supported by the different resources will now be discussed via flowcharts in FIGS. 9 and 10. Note that the steps in the flowcharts below can be executed in any suitable order.

Figure 9:
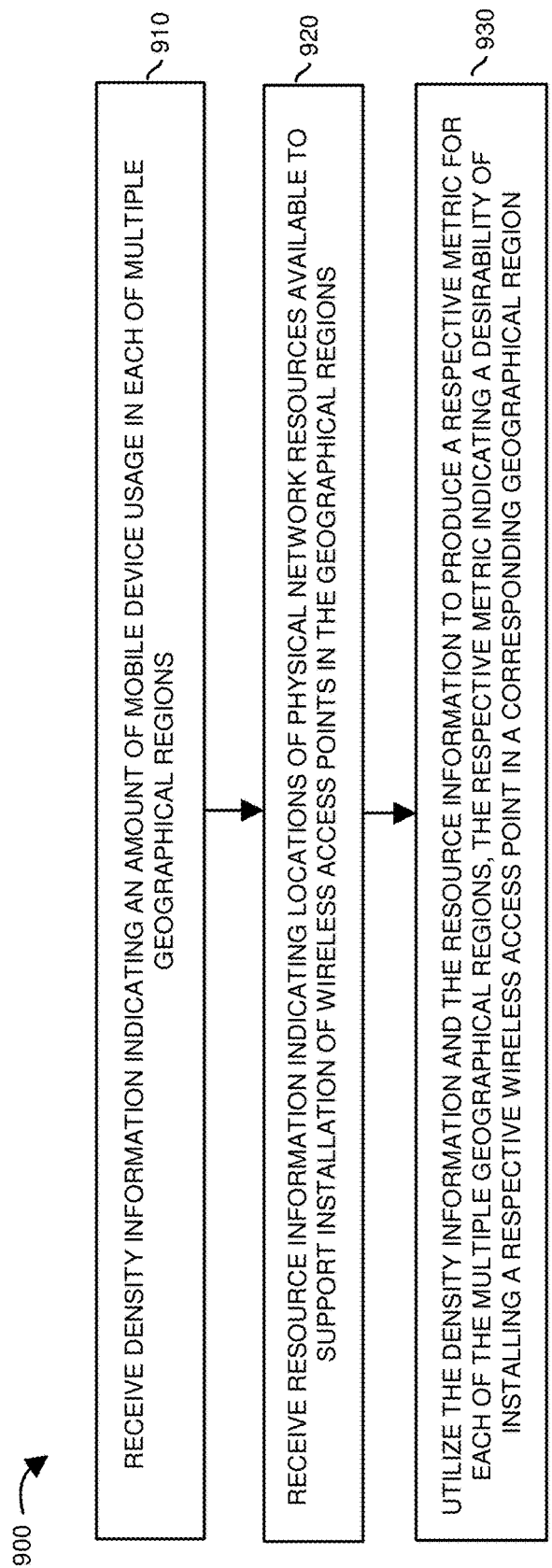
FIGS. 9 and 10 are example diagrams illustrating methods according to embodiments herein.
Figure 10:
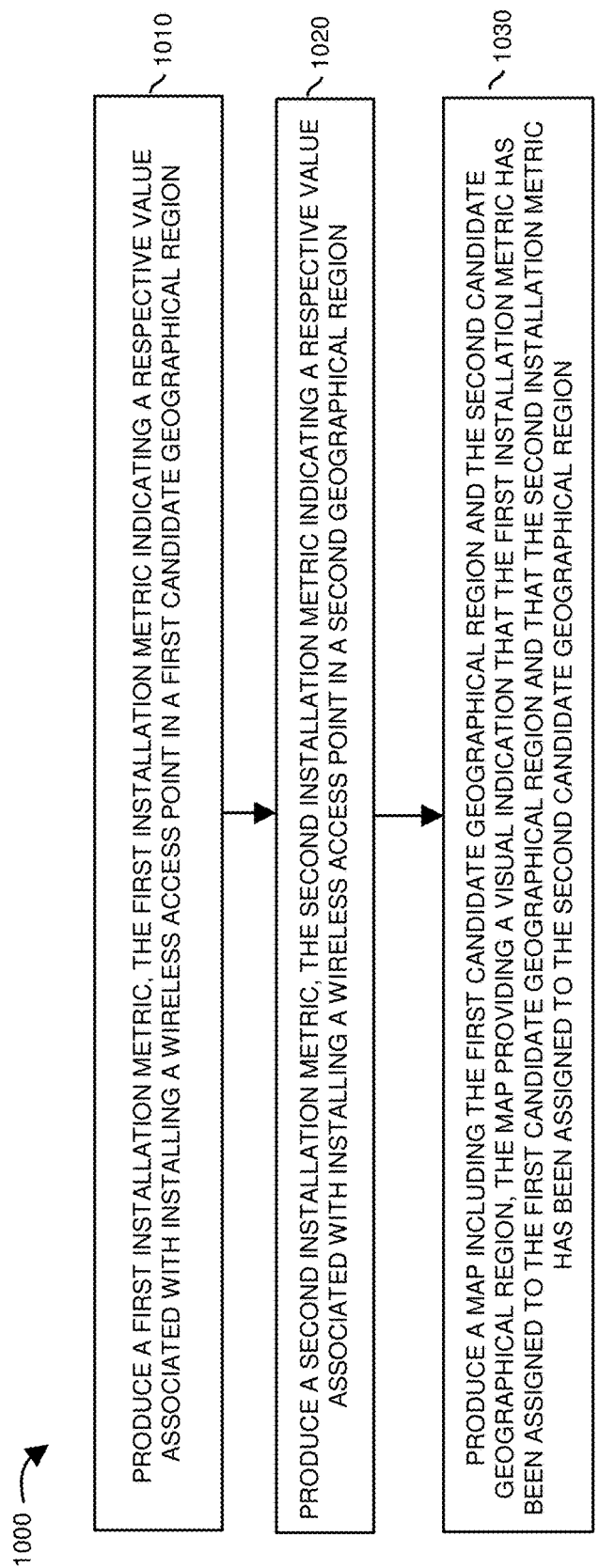

FIG. 9 is a flowchart 900 illustrating an example method according to embodiments. Note that there will be some overlap with respect to concepts as discussed above.

In processing block 910, the analyzer resource 140 receives density information (such as usage information 120) indicating an amount of mobile device usage in each of multiple geographical regions.

In processing block 920, the analyzer resource 140 receives resource information (such as network resource information 122) indicating locations of physical network resources available to support installation of wireless access points in the geographical regions.

In processing block 930, the analyzer resource 140 utilizes the density information and the resource information to produce a respective metric for each of the multiple geographical regions. Respective generated metrics indicate a desirability of installing a respective wireless access point in a corresponding geographical region FIG. 10 is a flowchart 1000 illustrating an example method according to embodiments. Note that there will be some overlap with respect to concepts as discussed above.

In processing block 1010, the analyzer resource 140 produces a first installation metric (such as M1). The first installation metric indicates a respective value associated with installing a wireless access point in a first candidate geographical region (211-1).

In processing block 1020, the analyzer resource 140 produces a second installation metric (such as M4). The second installation metric indicating a respective value associated with installing a wireless access point in a second geographical region (213-2).

In processing block 1030, the manager 150 produces a map 160 including the first candidate geographical region 211-1 and the second candidate geographical region 213-2. The map 160 provides a visual indication that the first installation metric (M1) has been assigned to the first candidate geographical region 211-1 and that the second installation metric (M2) has been assigned to the second candidate geographical region 213-4.

In accordance with yet further embodiments as set forth in FIGS. 11-20, an analyzer resource can be configured to receive usage information collected by one or more respective applications executed on a roaming mobile device; the usage information indicates geographical regions (and potentially specific locations) in which the roaming mobile communication devices wirelessly access a remote network (such as the Internet) using any of one or more different wireless access services. To make a determination of whether any of one or more candidate geographical regions (such as regions of high wireless usage) warrants installation of one or more new wireless access points, the analyzer resource obtains resource information indicating locations of physical network resources available (as previously discussed) to support installation of wireless access points in the geographical regions and the location of any existing wireless access points already installed. The analyzer resource then uses at least the mobile device application-collected wireless usage information and the resource information (indicating resource availability) to identify where to install at least one new wireless access point. Further disclosed embodiments herein include generating a respective visual map indicating in which of one or more respective candidate geographical regions it is desirable to install a respective new wireless access point.

Figure 11:
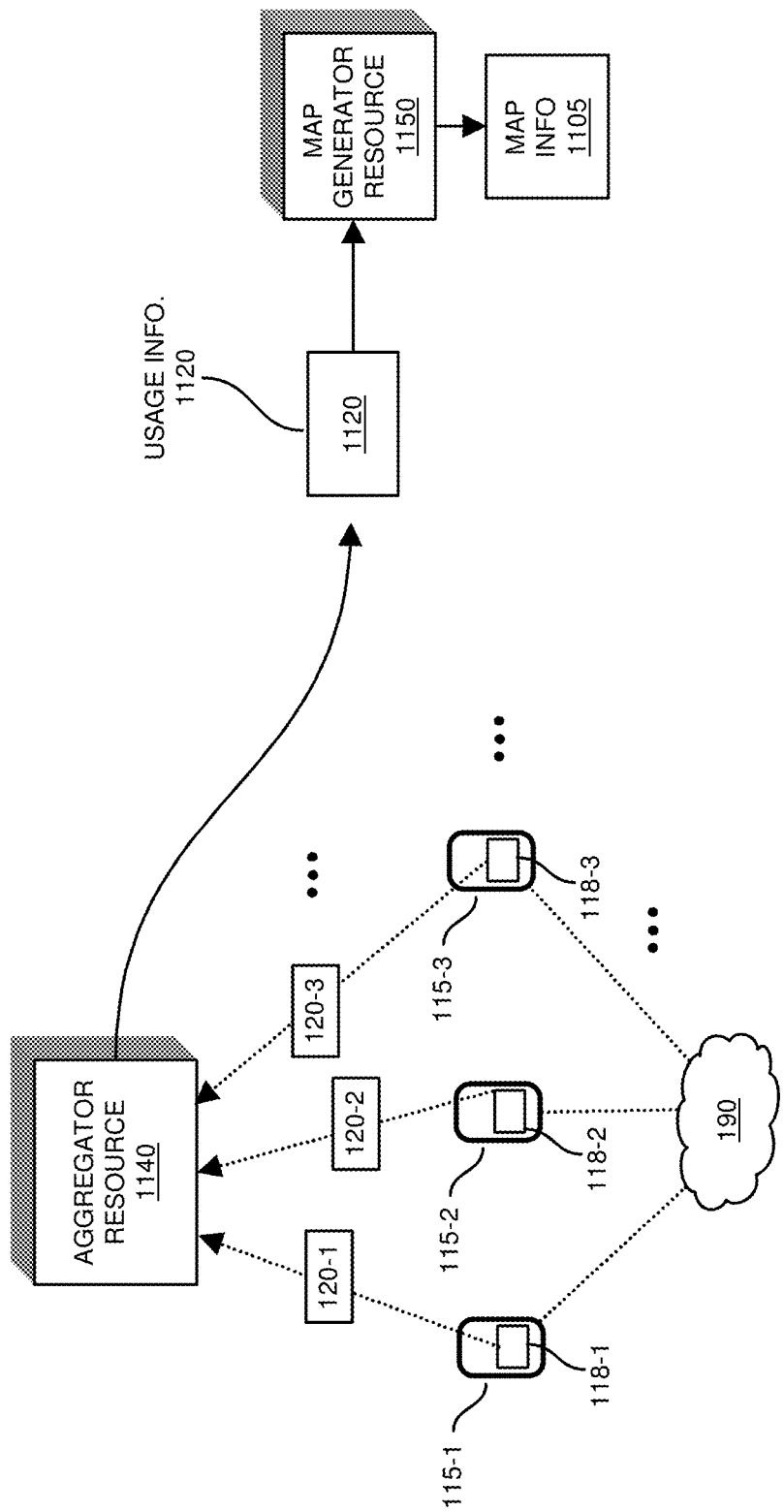
FIG. 11 is an example diagram illustrating collection of wireless network usage information by each of multiple collection applications according to embodiments herein.

Now, more specifically, FIG. 11 is an example diagram illustrating collection of wireless network usage information by each of multiple applications according to embodiments herein.

As previously discussed, FIGS. 1-10 illustrate a way to identify geographical regions in which to potentially install one or more new wireless access points based on multiple different types of information (predicted usage information 120, network resource information 122, consumer business information 124, existing wireless access point information 126, land use information 128, etc.).

As further shown in FIG. 11, embodiments herein can include multiple roaming mobile communication devices 115 (including mobile communication device 115-1, mobile communication device 115-2, mobile communication device 115-3, etc.). Mobile communication devices 115 roam about and geographical regions 211.

In one embodiment, each of the communication devices 115 executes a corresponding monitor application 118. For example, communication device 115-1 executes monitor application 118-1, communication device 115-2 executes monitor application 118-2, communication device 115-3 executes monitor application 118-3, etc.

Each of the applications 118 can be configured to operate in a similar manner. For example, each of the monitor applications 118 can be configured to produce respective wireless usage information indicating when the respective communication device is used to wirelessly access network 190 such as the Internet.

By further way of non-limiting example embodiment, each of the monitor applications 118 is configured to keep track of information such as i) a date and time of use when the respective communication device establishes a wireless communication link (such as a WiFi™ link, cellular phone, etc.) to communicate with any of one or more resources (such as server resources, wireless access points, target phone devices, etc.) in network 190, ii) the corresponding geographical location (such as precise coordinate location) where the communication device was used, iii) a duration of a respective communication session, iv) type of communication session (WiFi™, cellular phone, etc.), v) link quality associated with the communication session, etc.

Note that link quality can be generated based upon any suitable type of feedback information such as a wireless signal strength of receiving a respective wireless signal, an error rate of receiving or transmitting data over the respective wireless communication link, etc.

As further shown, subsequent to collection and forwarding of the wireless usage information 120, the aggregator resource 1140 analyzes the received usage information 120 from each of the applications 118 to produce corresponding usage information 1120 (aggregate usage information). As further discussed below, the usage information 1120 indicates a degree to which the aggregate or each of the mobile communication devices 115 is used in the different geographical regions to wirelessly access a remote network 190.

Further examples of collecting usage information are discussed below in FIGS. 12-14.

FIG. 12 is an example diagram illustrating usage information produced by a respective monitor application executed on a first mobile communication device according to embodiments herein.

As shown and as previously discussed, the monitor application 118-1 executing on mobile communication device 115-1 produces usage information 120-1.

In this example embodiment, it is known that the usage information 120-1 is associated with James Smith, an operator of respective mobile communication device 115-1. Assume that the subscriber James Smith subscribes to wireless network services provided by a first service provider (such as a TWC service provider). Additionally, assume that the subscriber James Smith subscribes to wireless network services provided by one or more additional service providers (non-TWC service providers such as a second service provider, third service provider, etc.) that provide wireless access to a remote network 190.

Usage information 120-1 indicates in which of multiple geographical locations (or specific locations) that the subscriber James Smith operates the mobile communication device 115-1 to access network 190 using services provided by one or more non-TWC service providers (such as a second service provider, third service provider, etc.).

As further discussed below, the usage information 120-1 collected by communication device 115-1 is particularly useful to the TWC service provider to identify geographical regions in which to potentially install one or more wireless access points to provide wireless network services to the TWC subscriber (James Smith).

In certain instances, the usage information 120-1 may indicate an identity of a corresponding non-TWC service provider that provides the corresponding wireless service to the respective subscriber. Accordingly, in such instances, it is possible for the TWC service provider to identify when the corresponding subscriber James Smith uses a respective non-TWC service provider to wirelessly access the network 190.

If service provider information is not available, as shown in FIG. 12, the usage information 120-1 may only indicate other attributes of the respective subscriber using the wireless network services provided by non-TWC service providers.

Note that geographical regions in which the subscriber James Smith operates the mobile communication device 115-1 to wirelessly access network 190 using non-TWC service provider services are potentially good candidate geographical regions in which the TWC service provider will consider to install one or more new wireless access point.

Thus, embodiments herein include deploying a respective monitor application 118 in each of multiple mobile communication devices to collect connection information that is in turn used to identify candidate regions in which to install new wireless access points.

As more specifically shown in FIG. 12, the first entry of usage information 120-1 collected by the application 118-1 indicates that the subscriber James Smith used the mobile communication device 115-1 on Jan. 3, 2016, at 5:22 PM, in geographical location 213-2, to establish a wireless communication link and access one or more resources in network 190. The first entry of usage information 120-1 further indicates that the duration of the communication session (and use of the established wireless communication link) is 25 minutes; the type of communication session is a WiFi™ communication session, having a very good link quality.

The second entry of usage information 120-1 indicates that the subscriber James Smith used the mobile communication device 115-1 on Jan. 3, 2016, at 8:31 PM, in geographical location 213-2, to establish a wireless communication link and access one or more resources in network 190. The second entry of usage information 120-1 further indicates that the duration of the communication session (and use of a corresponding established wireless communication link) is 18 minutes; the type of communication session is a WiFi™ communication session, having a poor wireless link quality.

The third entry of usage information 120-1 further indicates that the subscriber James Smith used the mobile communication device 115-1 on Jan. 4, 2016, at 5:13 PM, in geographical location 213-2, to establish a wireless communication link and access one or more resources in network 190. The third entry of usage information 120-1 further indicates that the duration of the communication session (and use of the established wireless communication link) is 35 minutes; the type of communication session is a WiFi™ communication session, having a good wireless link quality.

In a similar manner, each of the entries in usage information 120-1 indicates attributes of the subscriber James Smith using the mobile communication device 115-1 to wirelessly access network 190 at different times at different precise locations of a respective network environment.

In this example embodiment, the aggregator resource 1140 uses the usage information 120-1 to identify that the subscriber James Smith frequently uses the mobile communication device 115-1 in geographical locations 213-2, 213-3, 212-4, 214-3, 212-4 to wirelessly access the network 190.

FIG. 13 is an example diagram illustrating usage information produced by a respective monitor application executed on a second mobile communication device according to embodiments herein.

As shown, the monitor application 118-2 executing on the mobile communication device 115-2 produces usage information 120-2.

In this example embodiment, it is known that the usage information 120-2 is associated with John Doe, an operator of respective mobile communication device 115-2. Assume that the subscriber John Doe subscribes to wireless network services provided by a first service provider (such as a TWC service provider). Additionally, assume that the subscriber John Doe subscribes to wireless network services provided by one or more additional service providers (non-TWC service providers such as a second service provider, third service provider, etc.).

Usage information 120-2 indicates in which of multiple geographical locations the subscriber John Doe operates the mobile communication device 115-2 to access network 190 using services provided by non-TWC service providers. As previously discussed, this information is particularly useful to the TWC service provider to identify geographical regions in which to potentially install one or more wireless access points to provide wireless network services to the TWC subscriber (John Doe).

As further discussed below and as previously discussed, geographical regions in which the subscriber John Doe operates the mobile communication device 115-2 to access network 190 using non-TWC service provider services are candidate geographical regions in which the TWC service provider will consider to install one or more new wireless access points. Accordingly, embodiments herein include deploying a respective monitor application in each of multiple mobile communication devices to collect connection information that is in turn used to identify candidate regions in which to install new wireless access points.

As shown in FIG. 13, the first entry of usage information 120-2 indicates that the subscriber John Doe utilizes the mobile communication device 115-2 on Jan. 3, 2016, at 4:15 PM, in geographical location 213-3, to establish a wireless communication link and access one or more resources in network 190. The first entry of usage information 120-2 further indicates that the duration of the communication session (and use of the established wireless communication link) is 4 minutes; the type of communication session is a cellular phone session, having a poor link quality.

The second entry of usage information 120-2 indicates that the subscriber John Doe utilizes the mobile communication device 115-2 on Jan. 7, 2016, at 12:31 PM, in geographical location 213-2, to establish a wireless communication link and access one or more resources in network 190. The second entry of usage information 120-2 further indicates that the duration of the communication session (and use of the established wireless communication link) is 7 minutes; the type of communication session is a WiFi™ communication session, having good wireless link quality.

The third entry of usage information 120-2 indicates that the subscriber John Doe utilizes the mobile communication device 115-1 on Jan. 9, 2016, at 8:13 PM, in geographical location 214-3, to establish a wireless communication link and access one or more resources in network 190. The third entry of usage information 120-2 further indicates that the duration of the communication session (and use of the established wireless communication link) is 22 minutes; the type of communication session is a WiFi™ communication session, having a very good wireless link quality.

In a similar manner, each of the entries in usage information 120-2 indicates attributes of the subscriber John Doe using the mobile communication device 115-2 to wirelessly access network 190.

In this example embodiment, the usage information 120-2 indicates that the TWC subscriber John Doe frequently uses the mobile communication device 115-2 in geographical locations 213-3, 213-2, 214-3, 212-4, 213-4, 211-1, etc., to wirelessly access the network 190.

FIG. 14 is an example diagram illustrating usage information produced by a respective monitor application executed on a third mobile communication device according to embodiments herein.

As shown, the monitor application 118-3 executing on mobile communication device 115-3 produces usage information 120-3. In this example embodiment, it is known that the usage information 120-3 is associated with David Johnson, an operator of respective mobile communication device 115-3.

Assume that the subscriber David Johnson subscribes to wireless network services provided by a first service provider (such as a TWC service provider). Additionally, assume that the subscriber David Johnson also subscribes to wireless network services provided by one or more additional service providers (non-TWC service providers such as a second service provider, third service provider, etc.).

Usage information 120-3 indicates in which of multiple geographical locations the subscriber David Johnson operates the mobile communication device 115-3 to access network 190 using services provided by non-TWC service providers. This information is particularly useful to the TWC service provider to identify geographical regions in which to potentially install one or more wireless access points to provide wireless network services to the TWC subscriber (David Johnson).

As further discussed below, geographical regions in which the subscriber David Johnson operates the mobile communication device 115-3 to access network 190 using non-TWC service provider services are candidate geographical regions in which the TWC service provider will consider to install one or more new wireless access point.

As shown in FIG. 13, the first entry of usage information 120-3 indicates that the subscriber David Johnson utilizes the mobile communication device 115-3 on Jan. 2, 2016, at 11:54 PM, in geographical location 213-6, to establish a wireless communication link and access one or more resources in network 190. The first entry of usage information 120-3 further indicates that the duration of the communication session (and use of the established wireless communication link) is 25 minutes; the type of communication session is a WiFi™ session, having a very good link quality.

The second entry of usage information 120-3 indicates that the subscriber David Johnson utilizes the mobile communication device 115-3 on Jan. 3, 2016, at 10:28 AM, in geographical location 213-2, to establish a wireless communication link and access one or more resources in network 190. The second entry of usage information 120-3 further indicates that the duration of the communication session (and use of the established wireless communication link) is 4 minutes; the type of communication session is a cellular phone communication session, having good wireless link quality.

The third entry of usage information 120-3 indicates that the subscriber David Johnson utilizes the mobile communication device 115-3 on Jan. 5, 2016, at 3:54 PM, in geographical location 214-4, to establish a wireless communication link and access one or more resources in network 190. The third entry of usage information 120-3 further indicates that the duration of the communication session (and use of the established wireless communication link) is 16 minutes; the type of communication session is a WiFi™ communication session, having a poor wireless link quality.

In a similar manner, each of the entries in usage information 120-3 indicates attributes of the subscriber David Johnson using the mobile communication device 115-3 to wirelessly access network 190.

In this example embodiment, the usage information 120-3 indicates that the TWC subscriber David Johnson frequently uses the mobile communication device 115-3 in geographical locations 213-6, 213-2, 214-4, 215-5, 214-3, 212-4, etc., to wirelessly access the network 190.

Note again that the usage information 120 collected by each of the communication devices can include: i) location information (such as latitude and longitude location GPS coordinates) indicating respective locations in the network environment in which the multiple communication devices access the remote network, and ii) wireless access usage information indicating a degree to which the communication devices use existing non-TWC wireless access points to access the remote network 190.

Note that that in addition to, or as an alternative to, indicating a duration of a respective communication session, the collected usage information 120 can indicate an amount of data transmitted in an upstream and/or downstream direction over the respective wireless communication link. This provides an indication of the amount of data traffic (such as number of bytes) for each of the respective communication sessions.

Referring again to FIG. 11, embodiments herein include utilizing the received usage information 120 to produce usage information 1120. Map generator resource 1150 uses the usage information 1120 to produce map information 1105, indicating areas of high and low wireless usage by corresponding TWC subscribers, but in which there is currently no wireless access point installed by the TWC service provider.

In this example embodiment, the map generator resource 1150 utilizes the received usage information 1120 from the subscribers to identify that geographical regions 211-1, 212-3, 212-4, 213-2, 213-3, 213-4, 213-6, 214-3, 215-5, etc., represent geographical regions in which a high number of TWC subscribers use non-TWC wireless services to access the network 190 such as the Internet. In one embodiment, the map generator resource 1150 marks (such as via shading, symbols, etc.) the corresponding geographical regions to indicate that they represent good candidate geographical regions (such as geographical regions 211-1, 212-3, 212-4, 213-2, 213-3, 213-4, 213-6, 214-3, 215-5, etc.) in which to potentially install one or more new TWC wireless access points because it is known that TWC customers often use non-TWC wireless access points to access network 190 in such regions.

In accordance with further embodiments, if desired, the service provider TWC, who collects usage information 120 from subscribers via applications 118, uses the map information 1105, itself, as a basis to identify in which of the multiple geographical regions to potentially install new wireless access points (such as WiFi™ access points) providing access to the remote network 190. For example, if it is known from feedback that the TWC subscribers (such as James Smith, John Doe, David Johnson, etc.) use a sufficiently high amount of non-TWC wireless resources (such as above a threshold value) to access network 190 and that the service provider TWC does not currently have a sufficient number of or any wireless access points in such geographical regions, the TWC service provider installs one or more new wireless access points in the high usage geographical regions 211-1, 212-3, 212-4, 213-2, 213-3, 213-4, 213-6, 214-3, 215-5, etc., to expand its current wireless coverage.

Conversely, the service provider TWC, who collects usage information 120 from subscribers via applications 118, can use the map information 1105, itself, as a basis to identify in which of the multiple geographical regions not to install new wireless access points (such as WiFi™ access points) providing access to the network 190. For example, if it is known from feedback that the very few TWC subscribers use non-TWC wireless resources to access network 190 in geographical regions in which the service provider TWC does not have coverage, the TWC service provider may elect not to install any new wireless access points because it would serve no purpose because they would be rarely used.

In a manner as previously discussed, further embodiments herein can include selecting a given geographical region in which to install a new wireless access point based at least in part on a magnitude of the multiple communication devices using the wireless network services provided by the second service provider, as well as an estimated cost of installing the new wireless access point in the given geographical region. High-traffic areas, where respective subscribers frequently use wireless network services, and in which it is relatively inexpensive to install a new wireless access point are desirable areas in which to go forward with a new wireless access point installation.

Figure 15:
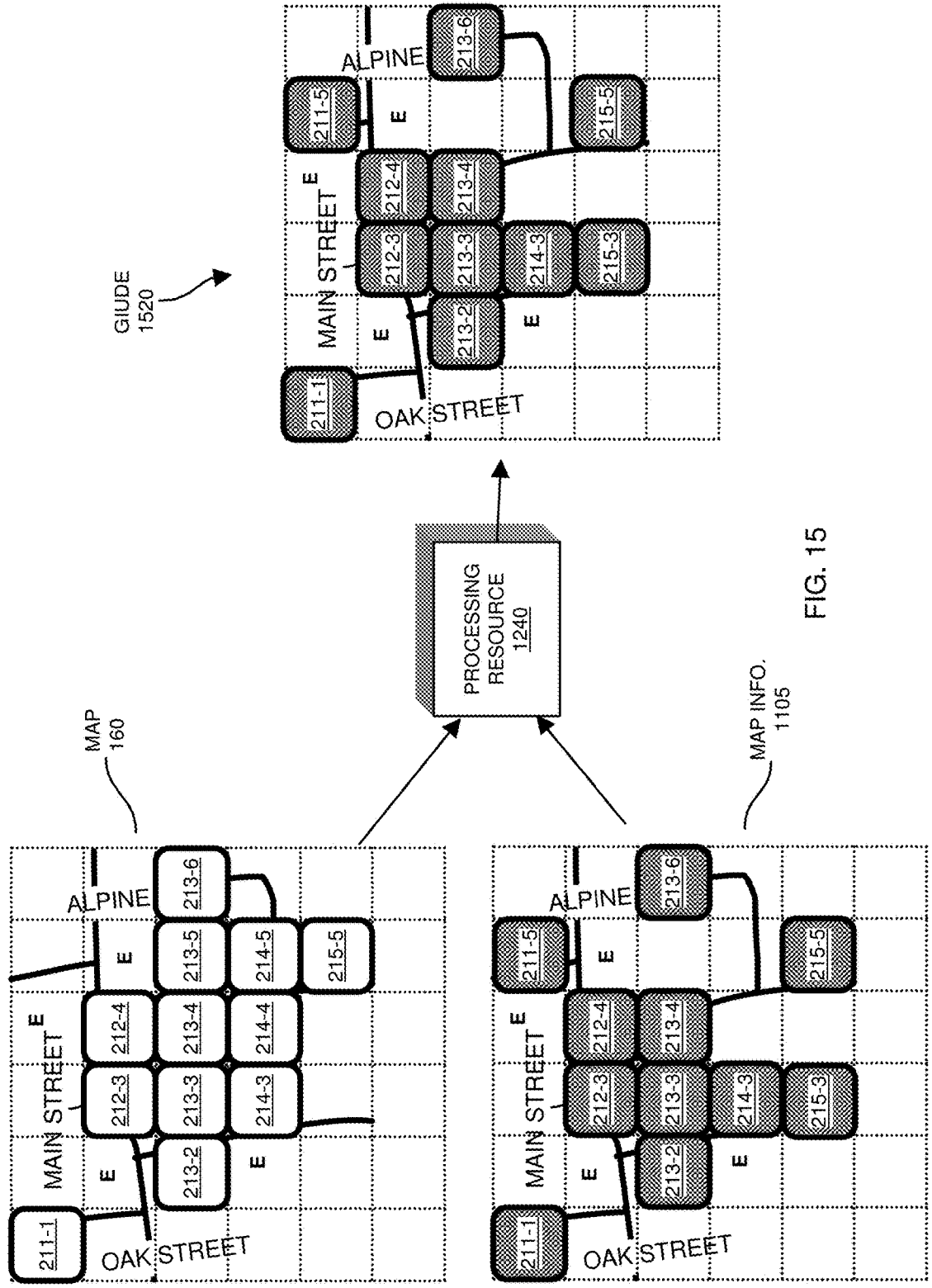
FIG. 15 is an example diagram illustrating application of wireless usage information collected by communication devices to produce a wireless access point installation guide according to embodiments herein.

FIG. 15 is an example diagram illustrating application of usage information collected by communication devices to produce a wireless access point installation guide according to embodiments herein.

In this example embodiment, processing resource 1240 receives the map information 160 generated in a manner as previously discussed with respect to FIGS. 1 to 10. Further, in a manner as previously discussed, the map generator resource 1150 in FIG. 11 produces the map information 1105 (such as derived from a real-time data, pseudo-real-time data, etc., received from monitor applications 118) collected by the mobile communication devices 115.

As shown, map information 1105 generated by the map generator resource 150 indicates regions of high wireless usage by corresponding subscribers of service provider TWC. For example, in one embodiment, as indicated by the usage information 120 from each of the applications 118, the aggregator resource 1140 detects that a parameter such as number of TWC subscribers above a threshold value reside in respective regions and use non-TWC service provider services to wirelessly access network 190.

Recall that map 160, in one embodiment, is derived based on predictive wireless usage information. Accordingly, it is prone to being inaccurate. To provide a more accurate assessment of whether one or more new wireless access point should be installed in respective geographical regions, the processing resource 1240 combines the map 160 with the map information 1105 (such as via an overlay technique) i) to confirm candidate geographical regions in which to install new wireless access points and/or ii) to identify candidate geographical regions which may not have been identified by map 160 as good candidates. In this latter instance, the usage information 120 received from the mobile communication devices provides a good way to ensure that the no geographical regions are missed or that a new wireless access point is installed in a geographical region in which the subscribers never use respective wireless services.

As yet further shown in this example embodiment, as previously discussed, map 160 indicates that geographical regions 211-1, 212-3, 212-4, 213-2, 213-3, 213-4, 213-5, 213-6, 214-3, 214-4, 214-5, and 215-5 are good candidates (some predicted as being better value than others as previously discussed in FIGS. 5 and 6) in which to consider installation of new wireless access points. Note that the TWC service provider already has existing wireless access points located in geographical region marked with the symbol "E". Specifically, as previously discussed, the TWC service provider already has wireless access points installed in geographical regions 211-4, 212-2, 212-5, and 214-2.

Assume that the TWC service provider currently has no wireless access points installed in other geographical regions 211-1, 211-2, 211-3, 211-5, 211-6, 212-1, 212-3, 212-4, 212-6, 213-1, 213-2, etc. Such geographical regions are all possible candidates in which to install a respective the wireless access point.

Based on the received actual subscriber usage information 1120 and derived map information 1105 indicating that shaded (marked) geographical regions 211-1, 211-5, 212-3, 212-4, 213-2, 213-3, 213-4, 213-6, 214-3, 215-3, and 215-5, are good candidates in which to potentially install one or more new respective wireless access points.

In one embodiment, the processing resource 1240 combines map 160 with map information 1105 to produce installation guide 1520. As a result, the produced installation guide 1520 indicates that geographical regions 211-1, 211-5, 212-3, 212-4, 213-2, 213-3, 213-4, 213-6, 214-3, 215-3 and 215-5 are all good candidate geographical regions in which to consider installing a respective new wireless access point.

In this example, use of the usage information 120 collected by the applications 118 on respective mobile communication device 115 ensures that locations such as geographical regions 211-5, 215-3, etc., are not missed as being good candidates in which to install a respective wireless access point.

Also, the map information 1105 as shown can indicate that geographical regions 213-5, 214-4, and 214-5 are poor candidates in which to install a new wireless access point because no subscribers use wireless services in these areas. In such an instance, via combining, the guide 1520 can indicate that such geographical regions are poor locations in which to install a respective new wireless access point even though the map 160 indicated that these locations were potentially of sufficient value to install a new wireless access point.

Accordingly, embodiments herein can include producing map 160 (such as a preliminary map) indicating a less-than-all subset of multiple regions (such as geographical regions 211-1, 212-3, 212-4, etc.) in which to potentially install one or more new wireless access points. The processing resource 1240 combines the map 160 with a secondary map (map information 1105) derived from the usage information 1120 (feedback from applications 118).

As previously discussed, note again that the map information 1105 itself can be used as a basis in which to make a determination of whether to install respective wireless access points.

Additionally, note that a given geographical region can be selected for installation of a new wireless access point based at least in part on a nearness to a cluster of other regions of the multiple geographical regions proposed for installation of corresponding new access points. For example, the map information 1105 can indicate that a single geographical location separated by more than a predetermined distance from other geographical locations is a highly used region to wirelessly access network 190. In one embodiment, because such a region is so far away from a cluster of other regions identified as being good candidates to install a respective wireless access point, the single region can be dismissed as a candidate.

In certain instances, the processing resource 1240 can be configured to identify respective locations in which mobile device users travel faster than a threshold value when roaming through a respective geographical region. In such an instance, the processing resource 1240 can be configured to eliminate the respective location as a candidate geographical location in which to install the new wireless access point because subsequent wireless usage may be limited.

Figure 16:
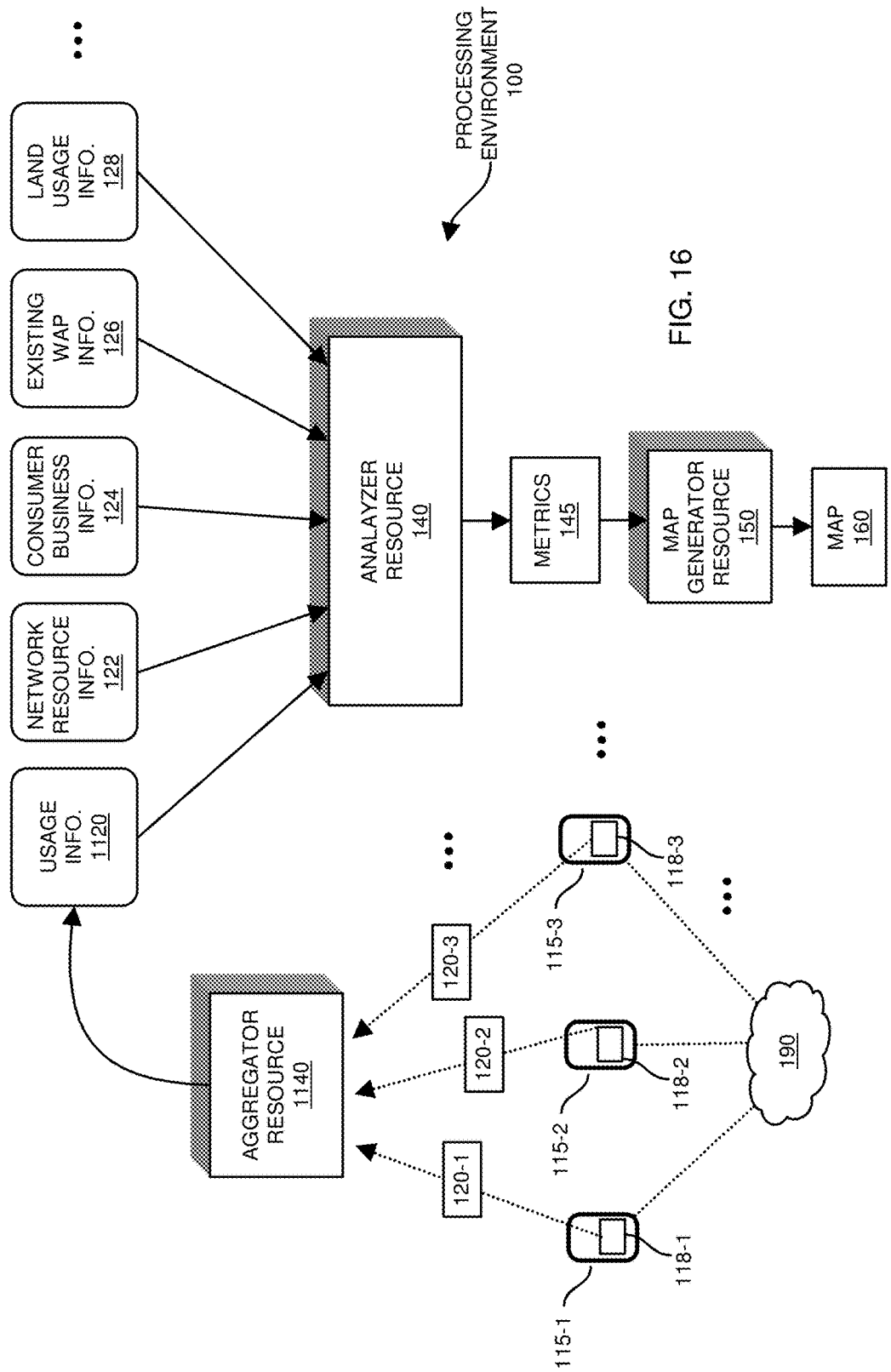
FIG. 16 is an example diagram illustrating an alternative way of using wireless usage information collected by communication devices to identify locations in which to install one or more new wireless access point according to embodiments herein.

FIG. 16 is an example diagram illustrating an alternative way of using usage information collected by communication devices to identify locations in which to install one or more new wireless access point according to embodiments herein.

In this example embodiment, instead of or in addition to receiving predictive information about usage, the analyzer resource 140 can be configured to receive actual usage information 1120 from aggregator resource 1140. As previously discussed, the applications 118 executing on respective mobile communication devices 115 provide the aggregator resource 1140 wireless usage information indicating regions in which the mobile communication devices 115 are used to wirelessly access remote network 190.

In a similar manner as previously discussed, the analyzer resource 140 utilizes one or more different types of input information such as usage information 1120, network resource information 122, consumer business information 124, existing wireless access point information 126, land usage information 128, etc., to produce metrics 145 indicating geographical regions in which there is sufficient value to install one or more new wireless access points.

Further, in a similar manner as previously discussed, the map generator resource 150 produces map 160 indicating relative values of installing new wireless access points in the different candidate geographical regions. In this latter instance, there is no need to overlay the generated map information 1105 with map 160 as in FIG. 15 because the map 160 takes into account the value of installing new wireless access points based upon feedback indicating the actual wireless usage in such regions.

Figure 17:
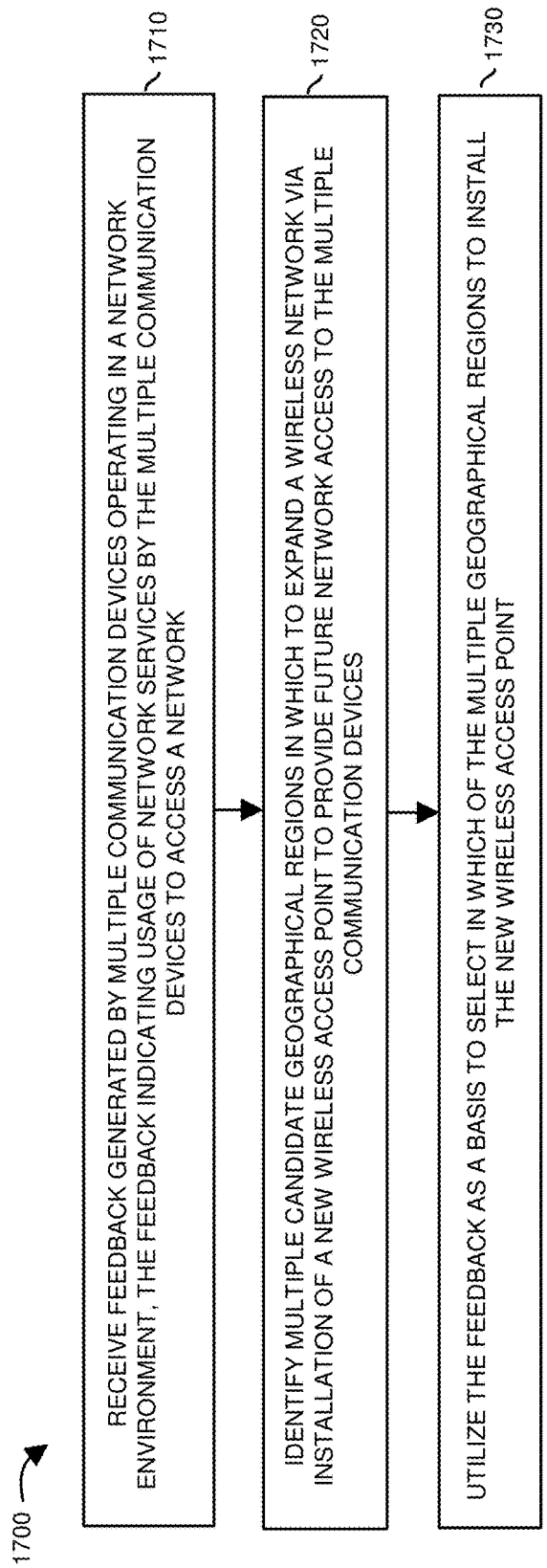
FIGS. 17, 18, 19, and 20 are example diagrams illustrating methods according to embodiments herein.

FIG. 17 is a flowchart 1700 illustrating an example method according to embodiments herein. Note that there will be some overlap with respect to concepts as discussed above.

In processing operation 1710, the aggregator resource 1140 receives feedback such as usage information 120-1, usage information 120-2, usage information 120-3, . . . , generated and/or collected by multiple communication devices 118. As previously discussed, the feedback indicates attributes of users and usage of network services by the multiple communication devices 118 to access a remote network such as the Internet. The aggregator resource 1140 utilizes the usage information 120 to produce usage map 1105.

In processing operation 1720, the map generator resource 1150 uses the usage information 1120 to produce map information 1105 indicating multiple candidate geographical regions in which to selectively expand a wireless network of wireless access points via installation of a new wireless access point to provide future network access to the multiple communication devices 115.

Figure 18:
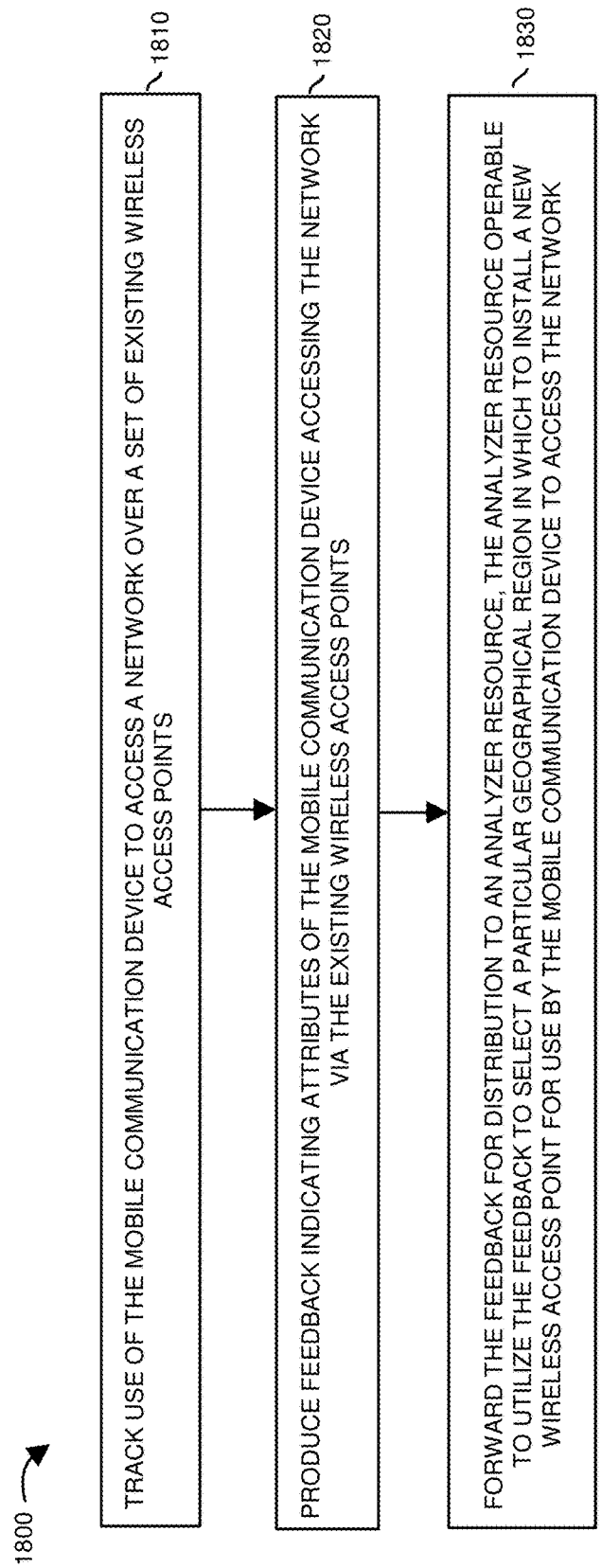

In processing operation 1730, the processing resource 1240 utilizes the received feedback (as captured by usage map information 1105) as a basis to select in which of the multiple geographical regions to install the new wireless access point FIG. 18 is a flowchart 1800 illustrating an example method according to embodiments herein. Note that there will be some overlap with respect to concepts as discussed above. Any of the mobile communication devices 115 executes a respective application (e.g., mobile computer device 115-1 executes application 118-1, mobile communication device 115-2 executes application 118-2, mobile communication device 115-3 executes application 118-3, . . . ) to perform the following operations.

In processing operation 1810, the monitor application 118-1 in mobile communication device 115-1 tracks use of the mobile communication device 115-1 accessing a network 190 over a set of existing wireless access points in such regions.

In processing operation 1820, the application 118-1 produces feedback (usage information 120-1) indicating attributes of the mobile communication device 118-1 accessing the network 190 such as the Internet via corresponding existing wireless access points.

In processing operation 1830, the application 118-1 forwards the feedback (usage information 120-1) to aggregator resource 1140. The aggregator resource 1140 uses the usage information 120 to produce usage information 1120 subsequently used to produce usage map information 1105. The aggregator resource 1140 provides the usage map information 1105 to the processing resource 1240 that, in turn, utilizes the feedback to select and/or identify a particular geographical region in which to install a new wireless access point for use by the mobile communication devices 115 to access one or more server resources in the network 190.

Figure 19:
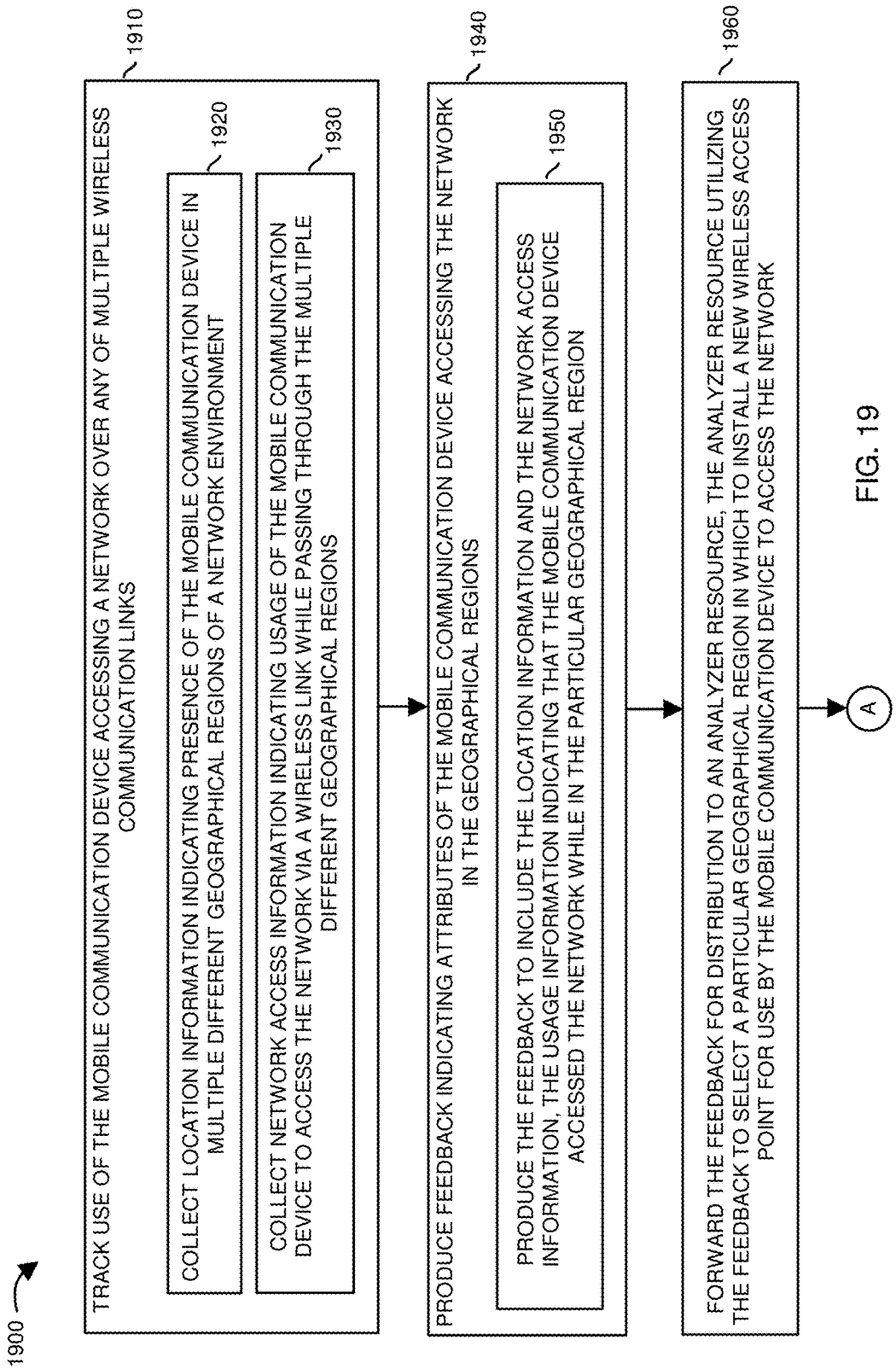

FIG. 19 is a flowchart 1900 illustrating an example method according to embodiments herein. Note that there will be some overlap with respect to concepts as discussed above.

In processing operation 1910, the monitor application 118-1 tracks attributes such as use of the mobile communication device 118-1 accessing a network 190 over any of multiple wireless communication links.

In processing operation 1920, the monitor application 118-1 collects location information indicating presence of the mobile communication device 115-1 in multiple different geographical regions of a network environment.

In processing operation 1930, the monitor application 118-1 collects network access information indicating usage of the mobile communication device 115-1 to access the network via one or more wireless links while passing through the multiple different geographical regions.

In processing operation 1940, the monitor application 118-1 produces feedback (such as usage information 120-1) indicating attributes (such as time of accessing a respective network 190, duration of a respective communication session, type of communication, wireless link quality, etc.) of the mobile communication device accessing the network in each of the geographical regions.

In processing operation 1950, the monitor application 118-1 produces the feedback (usage information 120-1) to include at least the location information and/or the network access information. As previously discussed, the usage information 120-1 is a real-time, updated record indicating that the mobile communication device 118-1 accessed the network 190 while in a corresponding geographical region.

In processing operation 1960, the monitor application 118-1 forwards the feedback from the mobile communication device 115-1 to one or more processing resources such as analyzer resource 140, aggregator resource 1140, etc., for identification and selection of a particular geographical region in which to install a new wireless access point for use by the mobile communication device to access the network.

Figure 20:
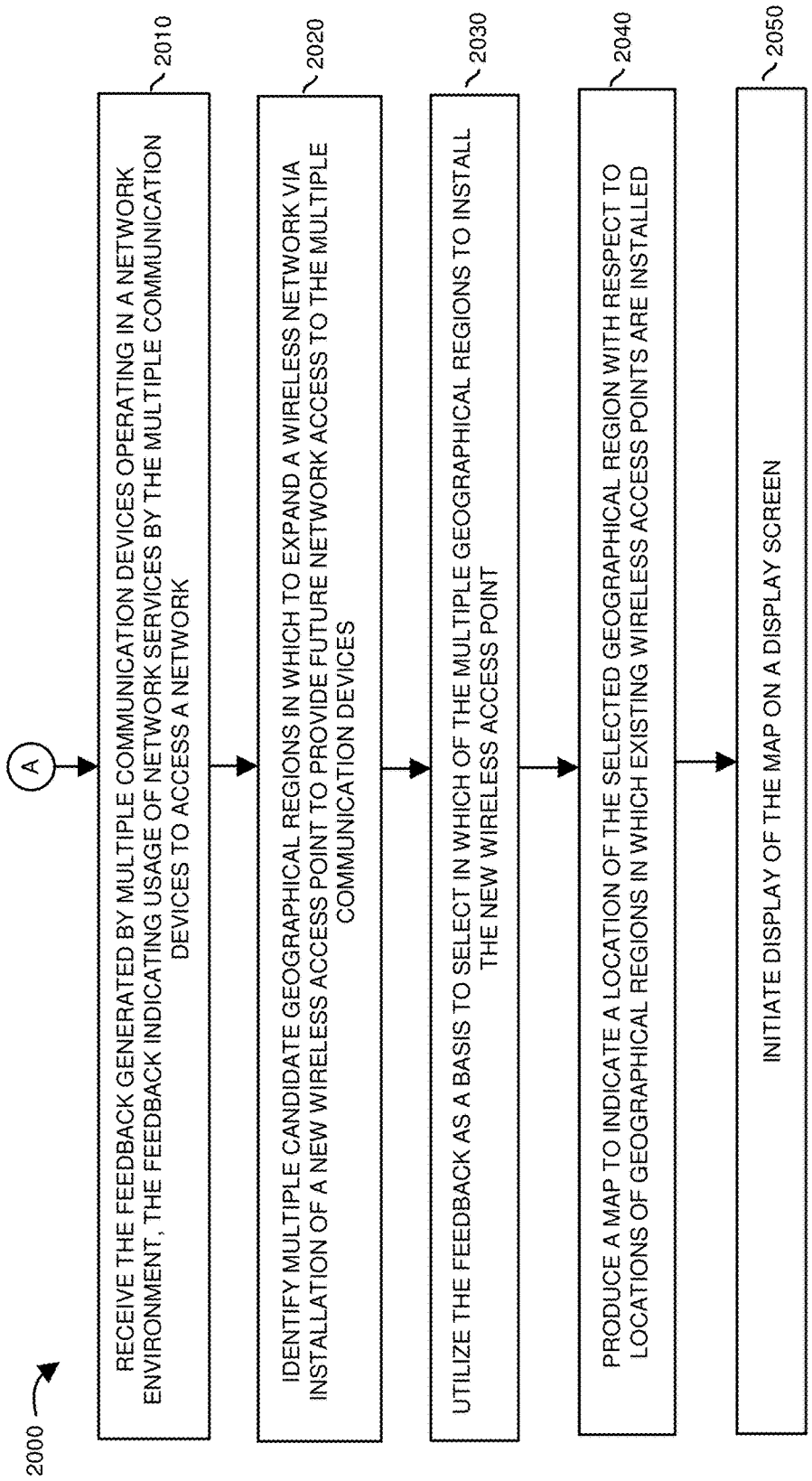

FIG. 20 is a flowchart 2000 illustrating an example method according to embodiments. Note that there will be some overlap with respect to concepts as discussed above.

In processing operation 2010, the aggregator resource 1140 receives the feedback (usage information 120) generated by multiple communication devices 115. The feedback indicates usage of network services by the multiple communication devices to access a network.

In processing operation 2020, the aggregator resource 1140 and map generator resource 1150 produce usage map information 1105 indicating multiple candidate geographical regions in which to potentially expand a wireless network via installation of a new wireless access point to provide future network access to the multiple communication devices 115.

In processing operation 2030, the processing resource 1240 (and/or TWC service provider) utilizes the feedback (as captured by the applications 118) as a basis to select in which of the multiple geographical regions to install one or more new wireless access points.

In processing operation 2040, the processing resource 1240 produces guide 1520 indicating proposed locations in which to install respective new wireless access point. In one embodiment, the proposed locations include one or more selected geographical regions (having no TWC wireless access point) with respect to locations of geographical regions in which existing wireless access points are installed.

In processing operation 2050, the processing resource 1240 initiates display of the map information 1520 on a display screen.

Note again that techniques herein are well suited for use in network environments in which a service provider analyzes geographical region for installation of one or more wireless access points to expand current wireless coverage to subscribers. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
    via computer processor hardware, performing operations of:
        receiving feedback generated by multiple communication devices operating in a network environment, the feedback indicating usage of existing wireless access points by the multiple communication devices to access a remote network;
        identifying multiple candidate geographical regions in which to expand a wireless network; and
        utilizing the feedback as a basis to select in which of the multiple candidate geographical regions to install a new wireless access point to provide the multiple communication devices future access to the remote network.

2. The method as in claim 1, wherein each of the multiple communication devices is operated by a respective user that subscribes to wireless network services provided by a corresponding first wireless network service provider, the first wireless network service provider providing no wireless network service coverage in the multiple candidate geographical regions.

3. The method as in claim 2, wherein the feedback indicates use of wireless network services provided by a second wireless network service provider in the geographical regions, the second wireless network service provider different than the first wireless network service provider.

4. The method as in claim 3, wherein utilizing the feedback to select in which of the multiple candidate geographical regions to install the new wireless access point further comprises:
    selecting a given geographical region from the multiple candidate geographical regions, the given geographical region selected based at least in part on an amount of prior usage by the communication devices of the wireless network services provided by the second wireless network service provider in the given geographical region.

5. The method as in claim 3, wherein utilizing the feedback to select in which of the multiple candidate geographical regions to install the new wireless access point further comprises:
    selecting a given geographical region from the multiple candidate geographical regions, the given geographical region selected based at least in part on: i) a magnitude of the multiple communication devices using the wireless network services provided by the second service provider, and ii) an estimated cost of installing the new wireless access point in the given geographical region.

6. The method as in claim 1, wherein the feedback includes: i) location information indicating respective locations in the network environment in which the multiple communication devices access the remote network, and ii) wireless access usage information indicating a degree to which the communication devices use the existing wireless access points to access the remote network.

7. The method as in claim 6, wherein utilizing the feedback to select in which of the multiple candidate geographical regions to install the new wireless access point further comprises:
    selecting a given geographical region from the multiple candidate geographical regions in which to install the new wireless access point, the given geographical region selected based at least in part on a magnitude of use of the existing wireless access points by the multiple communication devices in the given geographical region as indicated by the feedback.

8. The method as in claim 1 further comprising:
selecting a given geographical region from the multiple candidate geographical regions, the given geographical region selected for installation of the new wireless access point based at least in part on a nearness to a cluster of other regions of the multiple geographical regions proposed for installation of corresponding new access points.

9. The method as in claim 1 further comprising:
producing a preliminary map indicating a less-than-all subset of the multiple candidate geographical regions in which to potentially install new wireless access points; and
combining the preliminary map with a secondary map derived from the feedback, the secondary map indicating to select a given geographical region of the multiple candidate geographical regions in which to install the new wireless access point, the given geographical region selected based on feedback generated by client devices operated in the given geographical region.

10. The method as in claim 1 further comprising:
analyzing the geographical regions to identify a respective location in which communication device users travel faster than a threshold value; and
eliminating the respective location as a candidate location in which to install the new wireless access point.

11. The method as in claim 1, wherein the multiple communication devices are operable to keep track of prior communication sessions with the existing wireless access points to access the remote network; and
wherein the feedback indicates occurrence of the prior communication sessions.

12. The method as in claim 1, wherein the received feedback includes first feedback and second feedback, the first feedback indicating first prior communication sessions between a first communication device of the multiple communication devices and a first group of wireless access points in the network environment, the second feedback indicating second prior communication sessions between a second communication device of the multiple communication devices and a second group of wireless access points in the network environment.

13. The method as in claim 1, wherein the received feedback includes first feedback, the first feedback indicating a first group of multiple geographical regions in which a first communication device previously accessed the remote network; and
wherein the received feedback includes second feedback, the second feedback indicating a second group of multiple geographical regions in which the second communication device previously accessed the remote network.

14. The method as in claim 1, wherein the feedback indicates a group of geographical regions from which the multiple communication devices previously communicated with the existing wireless access points to access the remote network.

15. The method as in claim 14 further comprising: utilizing the group of geographical regions as specified by the feedback as a basis to select where to install the new wireless access point.

16. The method as in claim 1, wherein the feedback includes first feedback and second feedback, the first feedback indicating that a first communication device previously communicated from a geographical region, the second feedback indicating that a second communication device previously communicated from the geographical region.

17. The method as in claim 1, wherein utilizing the feedback to select in which of the multiple candidate geographical regions to install the new wireless access point further comprises:
selecting a particular geographical region from the multiple candidate geographical regions, the particular geographical region selected for installation of the new wireless access point based at least in part on an amount of prior usage by the communication devices to communicate with the remote network while in the particular geographical region.

18. The method as in claim 17, wherein the communication devices communicate using wireless access point services provided by a first wireless service provider over the existing wireless access points to communicate with the remote network while in the particular geographical region, the new wireless access point installed by a second wireless service provider to which users of the communication devices subscribe.

19. A method comprising:
via computer processor hardware, performing operations of:
at a mobile communication device, tracking use of the mobile communication device to access a remote network over a set of existing wireless access points;
producing feedback indicating attributes of the mobile communication device accessing the remote network via the existing wireless access points; and
forwarding the feedback for distribution to an analyzer resource, the analyzer resource operable to utilize the feedback to select a particular geographical region in which to install a new wireless access point for use by the mobile communication device to access the remote network.

20. The method as in claim 19, wherein tracking use of the mobile communication device further comprises:
collecting location information indicating presence of the mobile communication device in multiple different geographical regions of a network environment; and
collecting network access information indicating usage of the mobile communication device to access the remote network while passing through the multiple different geographical regions.

21. The method as in claim 20, wherein producing the feedback comprises: producing the feedback to include the location information and the network access information, the usage information indicating that the mobile communication device wirelessly accessed the remote network while in the particular geographical region.

22. The method as in claim 19, wherein the usage information indicates use of the mobile communication device to access the remote network via the existing wireless access points provided by first service providers; and
wherein the analyzer resource uses the feedback to provide notification to a second service provider of the particular geographical region in which to install the new wireless access point.

23. The method as in claim 19 further comprising:
producing a map to indicate a location of the selected geographical region with respect to locations of geographical regions in which existing wireless access points are installed; and
initiating display of the map on a display screen to indicate the location of the selected geographical region.

24. A computer system comprising:
computer processor hardware; and
a hardware storage resource coupled to the computer processor hardware, the hardware storage resource storing instructions that, when executed by the computer processor hardware, causes the computer processor hardware to perform operations of:
receiving feedback indicating prior usage of existing wireless access points by multiple communication devices to access a remote network, the prior usage determined based on detecting prior communication sessions between the multiple communication devices and the existing wireless access points;
identifying multiple candidate geographical regions in which to expand a wireless network; and
utilizing the feedback indicating the prior usage as a basis to select in which of the multiple candidate geographical regions to install a new wireless access point to provide the multiple communication devices future access to the remote network.

25. The computer system as in claim 24, wherein each of the multiple communication devices is operated by a respective user that subscribes to wireless network services provided by a corresponding first wireless network service provider, the first wireless network service provider providing no wireless network service coverage in the multiple candidate geographical regions.

26. The computer system as in claim 25, wherein the feedback indicates use of wireless network services provided by a second wireless network service provider in the geographical regions, the second wireless network service provider different than the first wireless network service provider.

27. The computer system as in claim 26, wherein utilizing the feedback to select which of the multiple candidate geographical regions in which to install the new wireless access point further comprises:
selecting a given geographical region from the multiple candidate geographical regions, the given geographical region selected based at least in part on a magnitude of usage by the communication devices of the wireless network services provided by the second wireless network service provider in the given geographical region.

28. The computer system as in claim 26, wherein utilizing the feedback to select which of the multiple candidate geographical regions in which to install the new wireless access point further comprises:
selecting a given geographical region from the multiple candidate geographical regions, the given geographical region selected based at least in part on: i) a magnitude of the multiple communication devices using the wireless network services provided by the second service provider, and ii) an estimated cost of installing the new wireless access point in the given geographical region.

29. The computer system as in claim 24, wherein the computer processor hardware further performs operations of:
selecting a given geographical region from the multiple candidate geographical regions, the given geographical region selected for installation of the new wireless access point based at least in part on a nearness to a cluster of other regions of the multiple geographical regions proposed for installation of corresponding new access points.

30. The computer system as in claim 24, wherein the computer processor hardware further performs operations of:
producing a preliminary map indicating a less-than-all subset of the multiple candidate geographical regions in which to potentially install new wireless access points; and
combining the preliminary map with a secondary map derived from the feedback, the secondary map indicating to select a given geographical region of the multiple candidate geographical regions in which to install the new wireless access point, the given geographical region selected based on feedback generated by client devices operated in the given geographical region.

31. A computer system comprising:
computer processor hardware; and
a hardware storage resource coupled to the computer processor hardware, the hardware storage resource storing instructions that, when executed by the computer processor hardware, causes the computer processor hardware to perform operations of:
at a mobile communication device, tracking use of the mobile communication device to access a remote network over a set of existing wireless access points;
producing feedback indicating attributes of the mobile communication device accessing the remote network via the existing wireless access points; and
forwarding the feedback for distribution to an analyzer resource, the analyzer resource operable to utilize the feedback to select a particular geographical region in which to install a new wireless access point for use by the mobile communication device to access the remote network.

32. The computer system as in claim 31, wherein tracking use of the mobile communication device further comprises:
collecting location information indicating presence of the mobile communication device in multiple different geographical regions of a network environment; and
collecting network access information indicating usage of the mobile communication device to access the remote network while passing through the multiple different geographical regions.

33. The computer system as in claim 32, wherein producing the feedback comprises: producing the feedback to include the location information and the network access information, the usage information indicating that the mobile communication device wirelessly accessed the remote network while in the particular geographical region.

34. The computer system as in claim 31, wherein the usage information indicates use of the mobile communication device to access the remote network via the existing wireless access points provided by first service providers; and
wherein the analyzer resource uses the feedback to provide notification to a second service provider of the particular geographical region in which to install the new wireless access point.

35. Computer-readable hardware storage having instructions stored thereon, the instructions, when carried out by computer processor hardware, causes the computer processor hardware to perform operations of:

receiving feedback generated by multiple communication devices operating in a network environment, the feedback indicating usage of existing wireless access points by the multiple communication devices to access a network;

identifying multiple candidate geographical regions in which to expand a wireless network via installation of a new wireless access point to provide future network access to the multiple communication devices; and utilizing the feedback as a basis to select in which of the multiple candidate geographical regions to install the new wireless access point.

* * * * *